US008248672B2

(12) United States Patent
Kimura

(10) Patent No.: US 8,248,672 B2
(45) Date of Patent: Aug. 21, 2012

(54) IMAGE WRITING UNIT, IMAGE FORMING APPARATUS, IMAGE WRITING METHOD AND COMPUTER-READABLE INFORMATION RECORDING MEDIUM

(75) Inventor: Tomonori Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 560 days.

(21) Appl. No.: 12/457,499

(22) Filed: Jun. 12, 2009

(65) Prior Publication Data

US 2009/0323137 A1 Dec. 31, 2009

(30) Foreign Application Priority Data

Jun. 12, 2008 (JP) ................................. 2008-154283
Jun. 8, 2009 (JP) ................................. 2009-137715

(51) Int. Cl.
*H04N 1/04* (2006.01)
(52) U.S. Cl. .......... 358/474; 358/1.9; 358/1.5; 358/475; 347/248; 726/32
(58) Field of Classification Search .................... 358/1.9, 358/1.5, 501, 474, 488, 475, 509, 530, 448, 358/461; 347/248; 726/32
See application file for complete search history.

(56) References Cited

U.S. PATENT DOCUMENTS

| | | | | | |
|---|---|---|---|---|---|
| 4,660,082 | A | * | 4/1987 | Tomohisa et al. | 348/615 |
| 4,823,195 | A | * | 4/1989 | Ito | 358/494 |
| 5,353,052 | A | * | 10/1994 | Suzuki et al. | 347/19 |
| 5,515,097 | A | * | 5/1996 | Munechika et al. | 347/241 |
| 5,710,634 | A | * | 1/1998 | Kuriyama et al. | 358/296 |
| 6,330,083 | B1 | * | 12/2001 | Nabeshima et al. | 358/474 |
| 6,876,946 | B2 | * | 4/2005 | Yasuda et al. | 702/152 |
| 7,247,841 | B2 | * | 7/2007 | Yoo | 250/234 |
| 7,626,606 | B2 | * | 12/2009 | Toyama et al. | 347/243 |
| 7,756,436 | B2 | * | 7/2010 | Yamane | 399/71 |
| 7,944,463 | B2 | * | 5/2011 | Toyama et al. | 347/243 |
| 8,004,724 | B2 | * | 8/2011 | Sakamoto | 358/412 |
| 2009/0025093 | A1 | | 1/2009 | Kimura | |
| 2011/0043595 | A1 | * | 2/2011 | Ishikawa | 347/248 |

FOREIGN PATENT DOCUMENTS

JP 10-065907 3/1998
JP 2008-100468 5/2008

* cited by examiner

*Primary Examiner* — Negussie Worku
(74) *Attorney, Agent, or Firm* — Harness, Dickey & Pierce, P.L.C.

(57) ABSTRACT

A plurality of the light emitting device array units are arranged along a main scan direction in a staggered manner. In a density transformation mode, a transformation pattern is used to transform image data for each matrix of n by n pixels. A rate of writing an image in a sub-scan direction is multiplied by m, and a pixel density of image data written on a photosensitive body is multiplied by (2B+1)/2 in the main scan direction, and multiplied by m(2B+1)/2 in the sub-scan direction. A transformation pattern which is selected according to a position along the main scan direction at which an image is written with respect to a position of each of the plurality of light emitting device array units is used to transform image data.

7 Claims, 37 Drawing Sheets

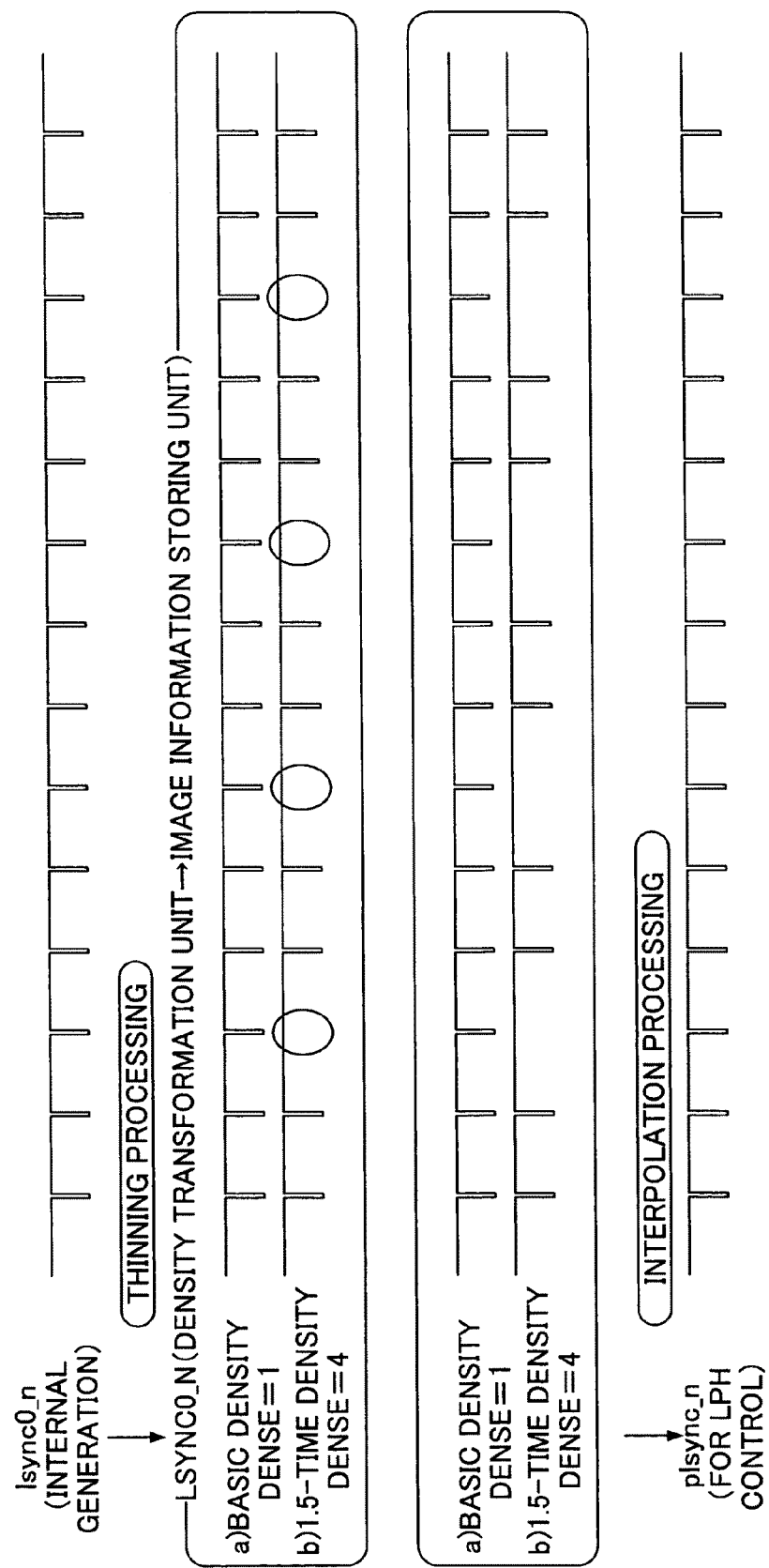

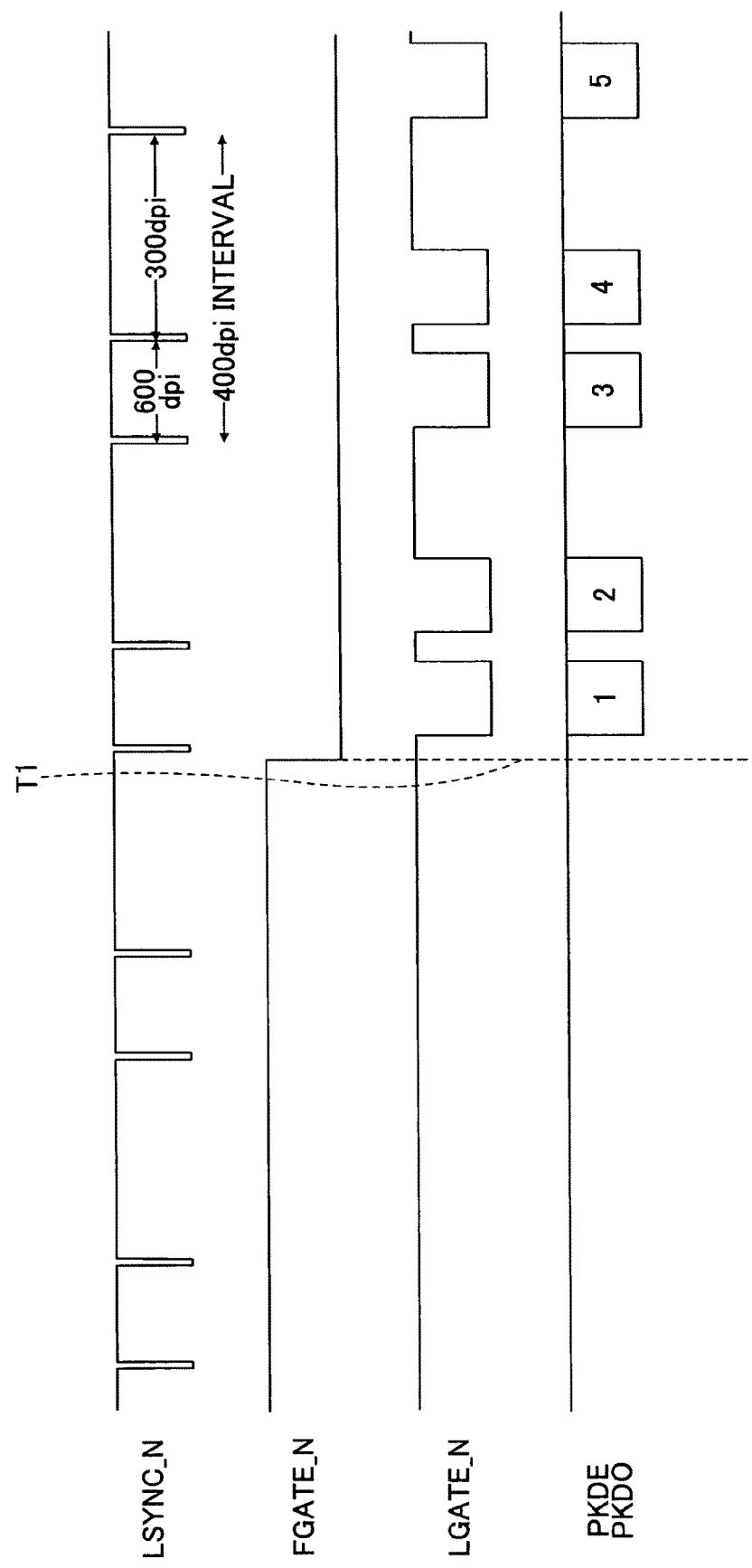

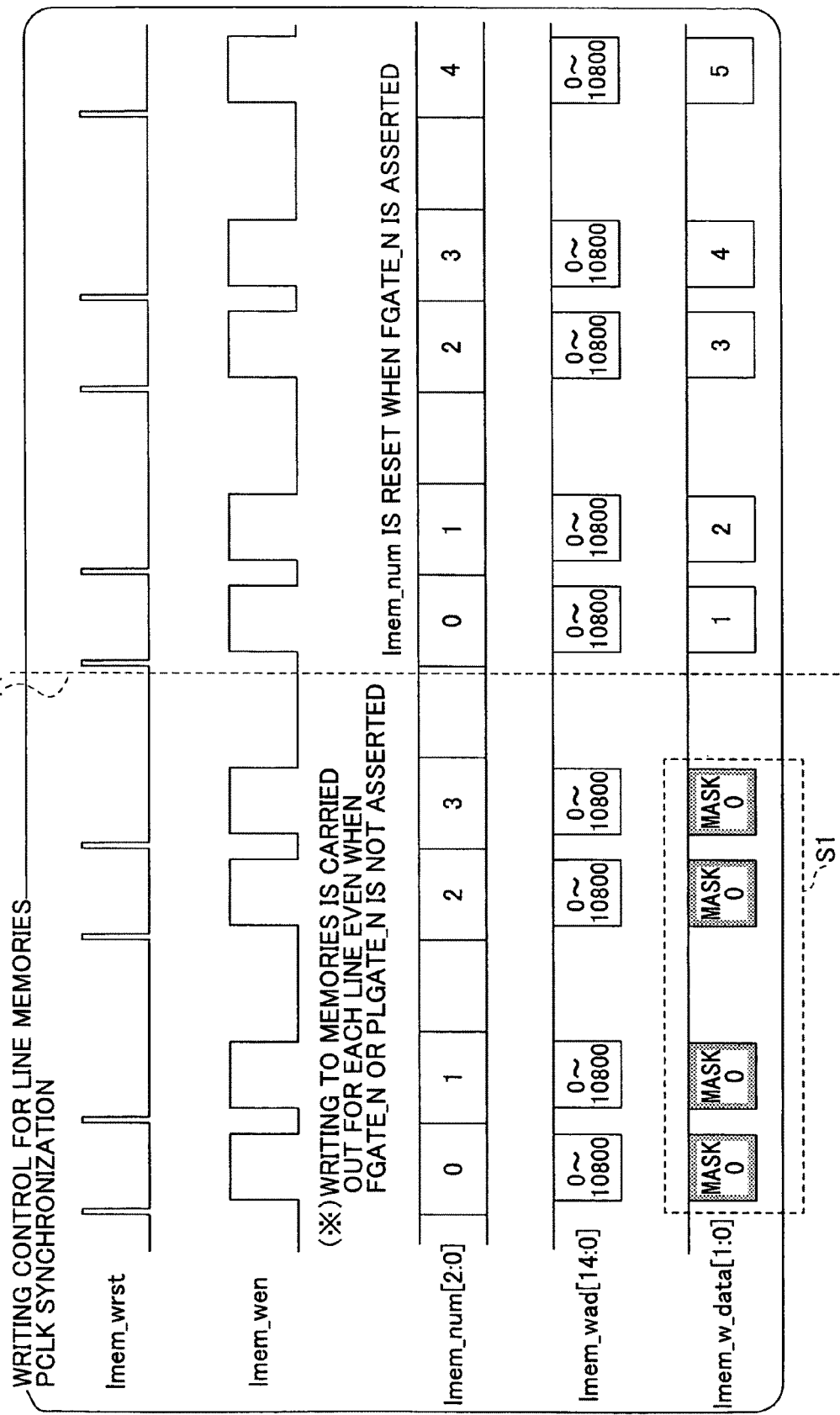

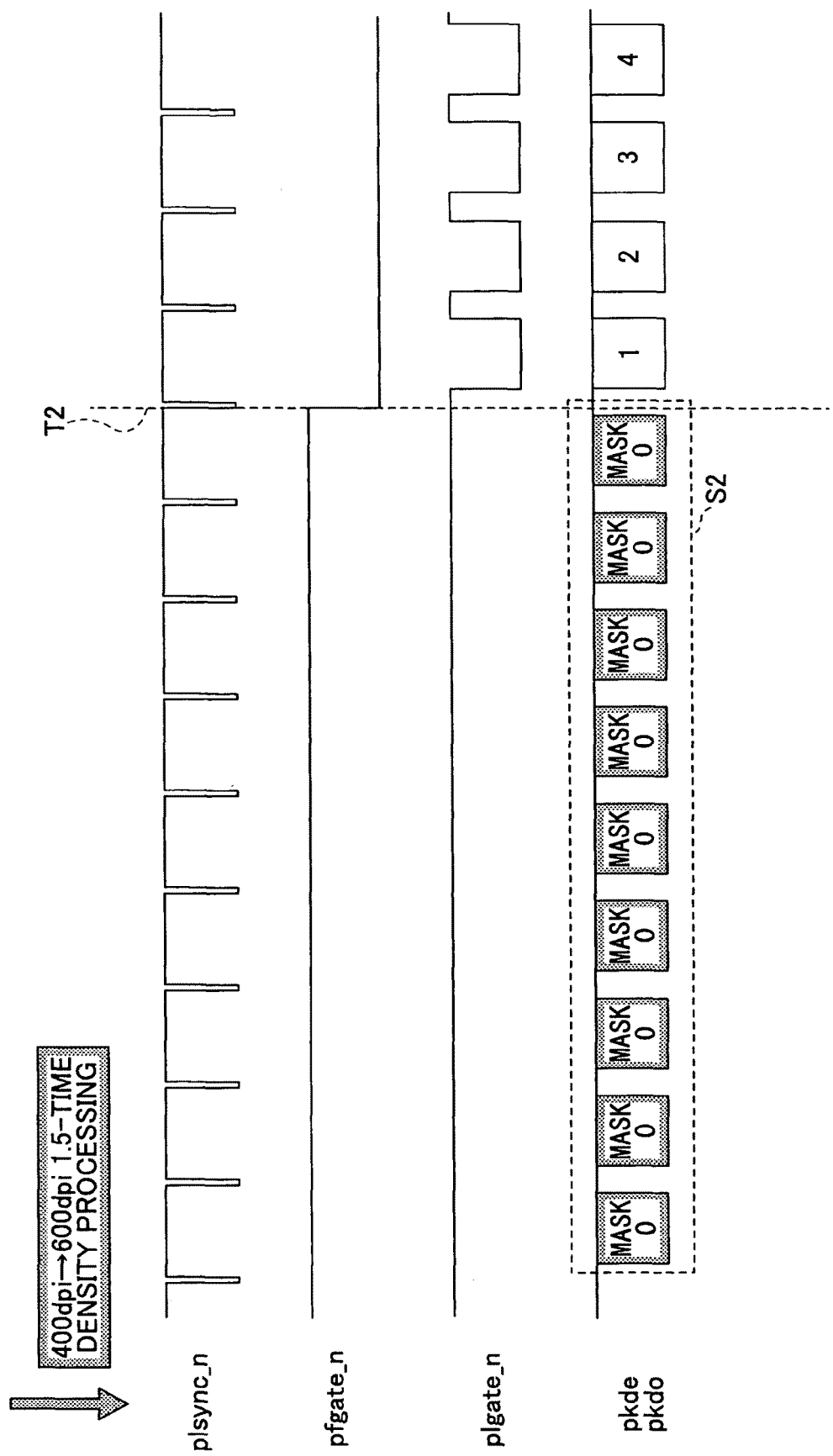

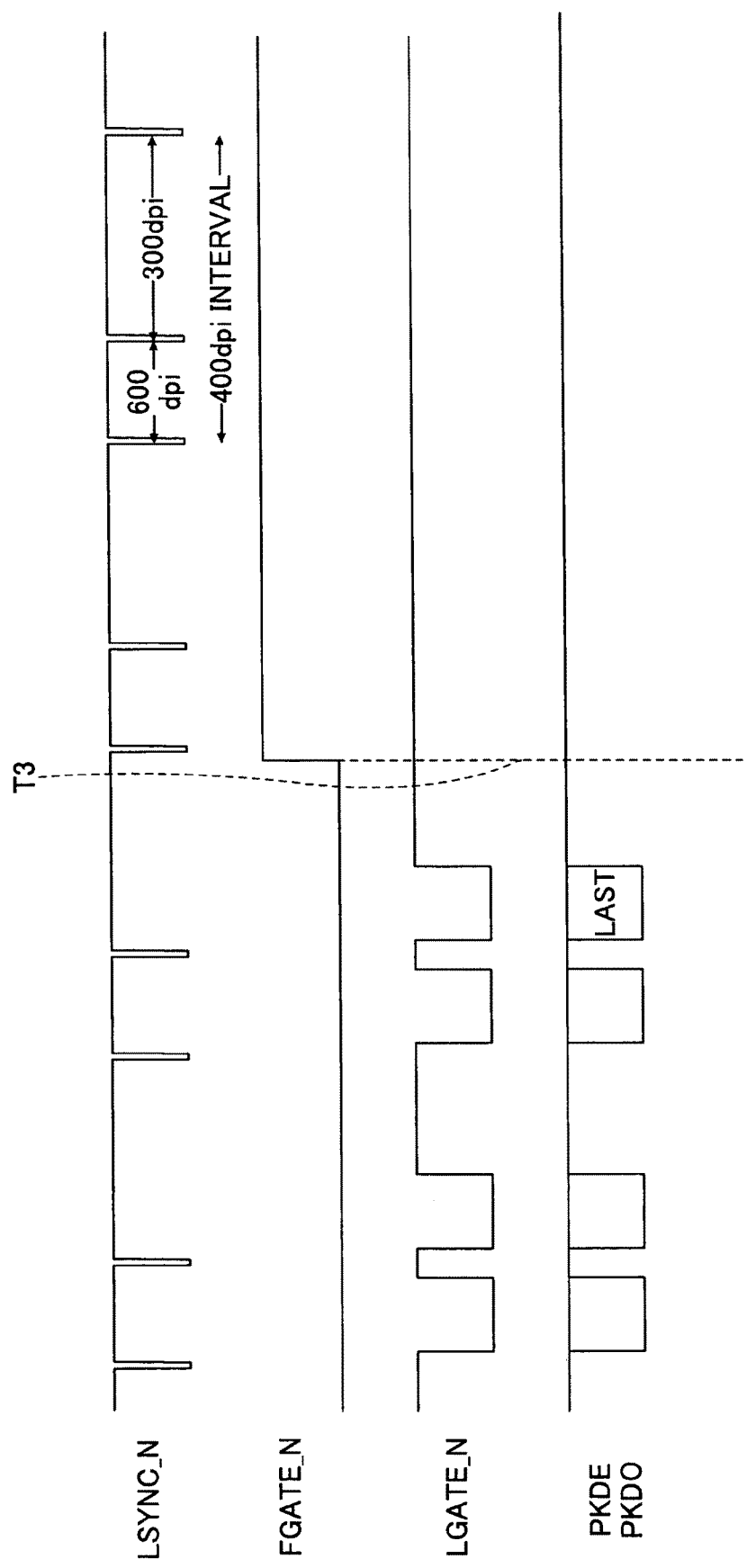

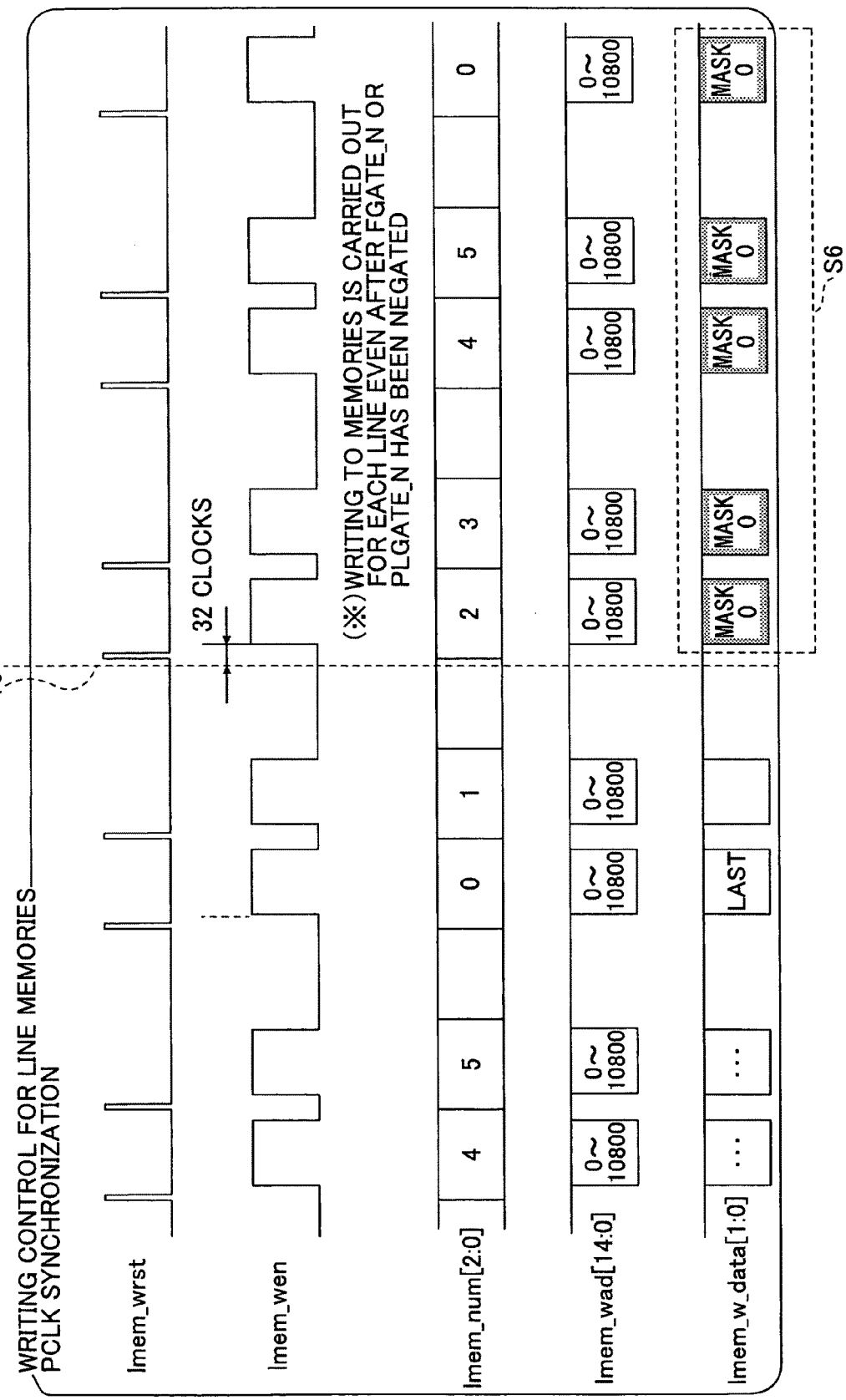

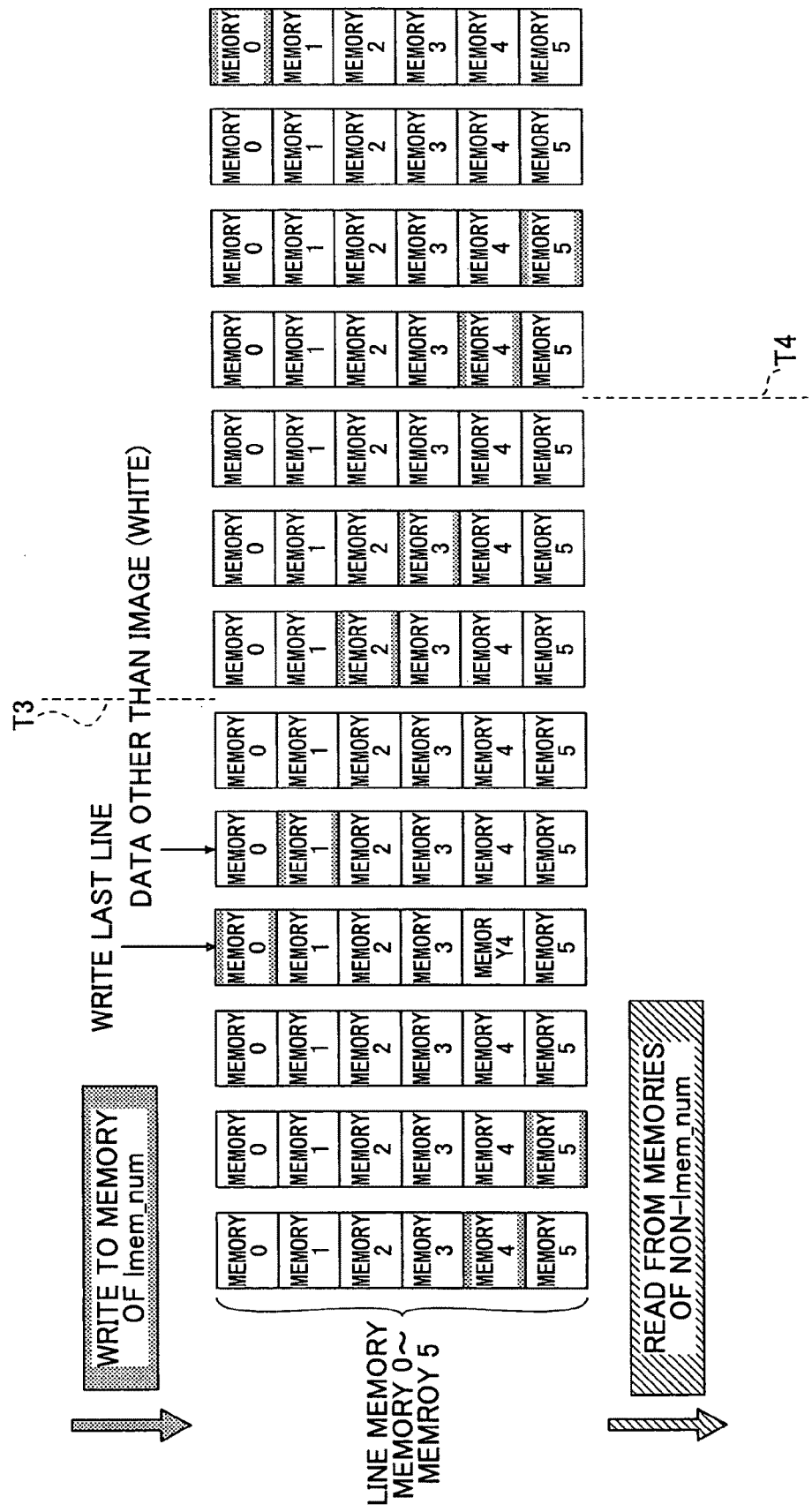

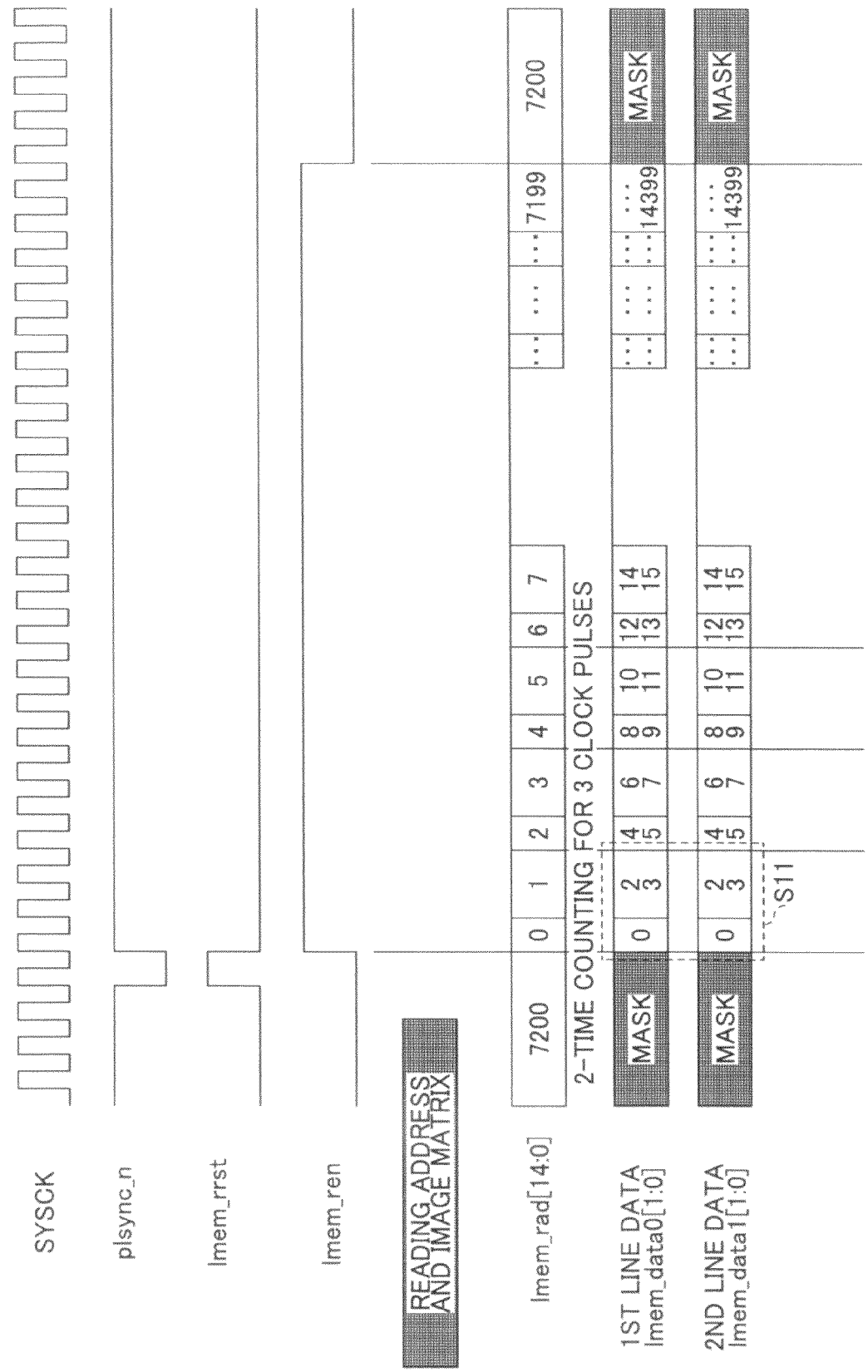

FIG.9C
AS SAME 400dpi 3 LINES COME FOR 2 LINES,
CORRESPONDING PARTS OF OUTPUT IMAGE
ARE GENERATED WITH REFERENCE TO FDCCNT
WHEN FDCCNT = 1 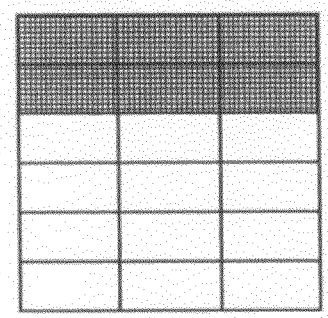
WHEN FDCCNT = 2 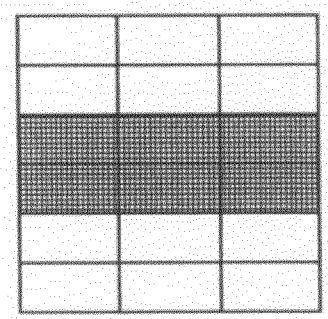
WHEN FDCCNT = 3 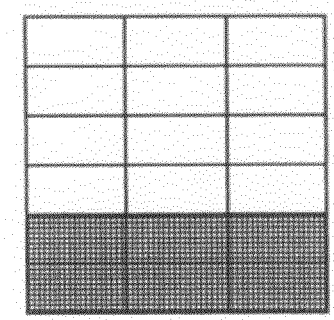

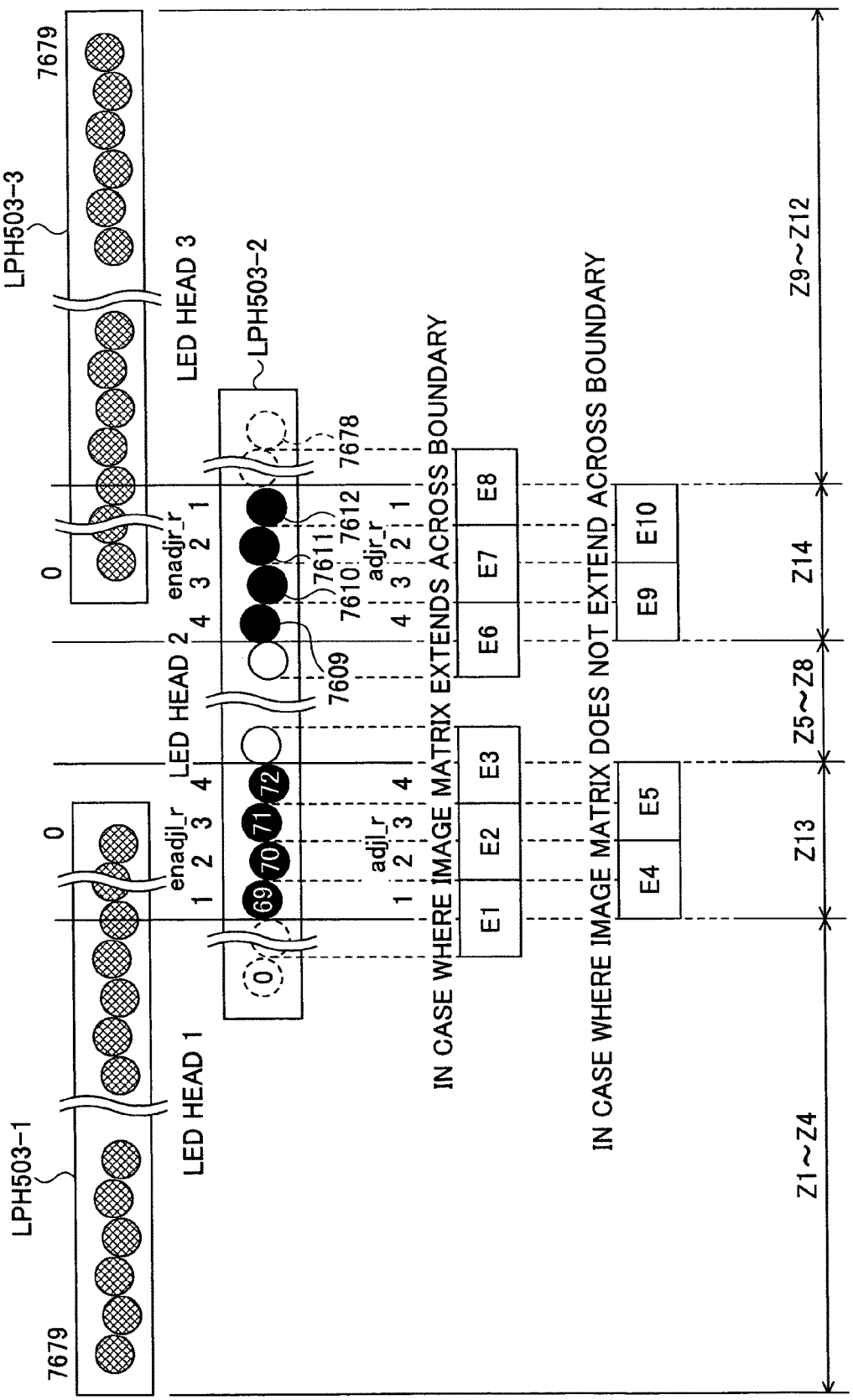

FIG.13

| NAME | D7 | D6 | D5 | D4 | D3 | D2 | D1 | D0 | Def |
|---|---|---|---|---|---|---|---|---|---|
| Opat1-1 | | | | | Opat1-1[7:0] | | | | FCh |
| Opat1-2 | | | | | Opat1-2[7:0] | | | | F3h |
| Opat1-3 | | | | | Opat1-3[7:0] | | | | F0h |
| Opat1-4 | | | | | Opat1-4[7:0] | | | | FFh |
| Opat1-5 | | | | | Opat1-5[7:0] | | | | 7Fh |
| Opat1-6 | | | | | Opat1-6[7:0] | | | | E0h |
| Opat1-7 | | | | | Opat1-7[7:0] | | | | 7Bh |
| Opat1-8 | | | | | Opat1-8[7:0] | | | | 3Fh |
| Opat1-9 | | | | | Opat1-9[7:0] | | | | BFh |
| Opat1-10 | | | | Opat1-10[7:0] | | | | | EFh |
| Opat1-11 | | | | Opat1-11[7:0] | | | | | F7h |
| Opat1-12 | | | | | | Opat1-12[3:0] | | | 0Dh |

FOR DIVIDED ZONE

| | Def |
|---|---|
| Opat12-6 | E0h |
| Opat12-7 | 7Bh |
| Opat12-8 | 3Fh |
| Opat12-9 | BFh |
| Opat12-10 | EFh |
| Opat12-11 | F7h |
| Opat12-12 | 0Dh |

| | | | |
|---|---|---|---|
| Opat12-6 | | Opat12-6[7:0] | |
| Opat12-7 | | Opat12-7[7:0] | |
| Opat12-8 | | Opat12-8[7:0] | |
| Opat12-9 | | Opat12-9[7:0] | |
| Opat12-10 | | Opat12-10[7:0] | |
| Opat12-11 | | Opat12-11[7:0] | |
| Opat12-12 | | | Opat12-12[3:0] |

FIG.14

| NAME | D7 | D6 | D5 | D4 | D3 | D2 | D1 | D0 | Def |
|---|---|---|---|---|---|---|---|---|---|
| Otpat1-1 | | | | Otpat1-1[7:0] | | | | | FCh |
| Otpat1-2 | | | | Otpat1-2[7:0] | | | | | F3h |
| Otpat1-3 | | | | Otpat1-3[7:0] | | | | | F0h |
| Otpat1-4 | | | | Otpat1-4[7:0] | | | | | FFh |
| Otpat1-5 | | | | Otpat1-5[7:0] | | | | | 7Fh |
| Otpat1-6 | | | | Otpat1-6[7:0] | | | | | E0h |
| Otpat1-7 | | | | Otpat1-7[7:0] | | | | | 7Bh |
| Otpat1-8 | | | | Otpat1-8[7:0] | | | | | 3Fh |
| Otpat1-9 | | | | Otpat1-9[7:0] | | | | | BFh |
| Otpat1-10 | | | | Otpat1-10[7:0] | | | | | EFh |
| Otpat1-11 | | | | Otpat1-11[7:0] | | | | | F7h |
| Otpat1-12 | | | | | Otpat1-12[3:0] | | | | 0Dh |

FOR JOINT PART

| NAME | D7 | D6 | D5 | D4 | D3 | D2 | D1 | D0 | Def |
|---|---|---|---|---|---|---|---|---|---|
| Otpat10-6 | | Otpat10-6[7:0] | | | | | | | E0h |
| Otpat10-7 | | Otpat10-7[7:0] | | | | | | | 7Bh |
| Otpat10-8 | | Otpat10-8[7:0] | | | | | | | 3Fh |
| Otpat10-9 | | Otpat10-9[7:0] | | | | | | | BFh |
| Otpat10-10 | | Otpat10-10[7:0] | | | | | | | EFh |
| Otpat10-11 | | Otpat10-11[7:0] | | | | | | | F7h |
| Otpat10-12 | | | | | Otpat10-12[3:0] | | | | 0Dh |

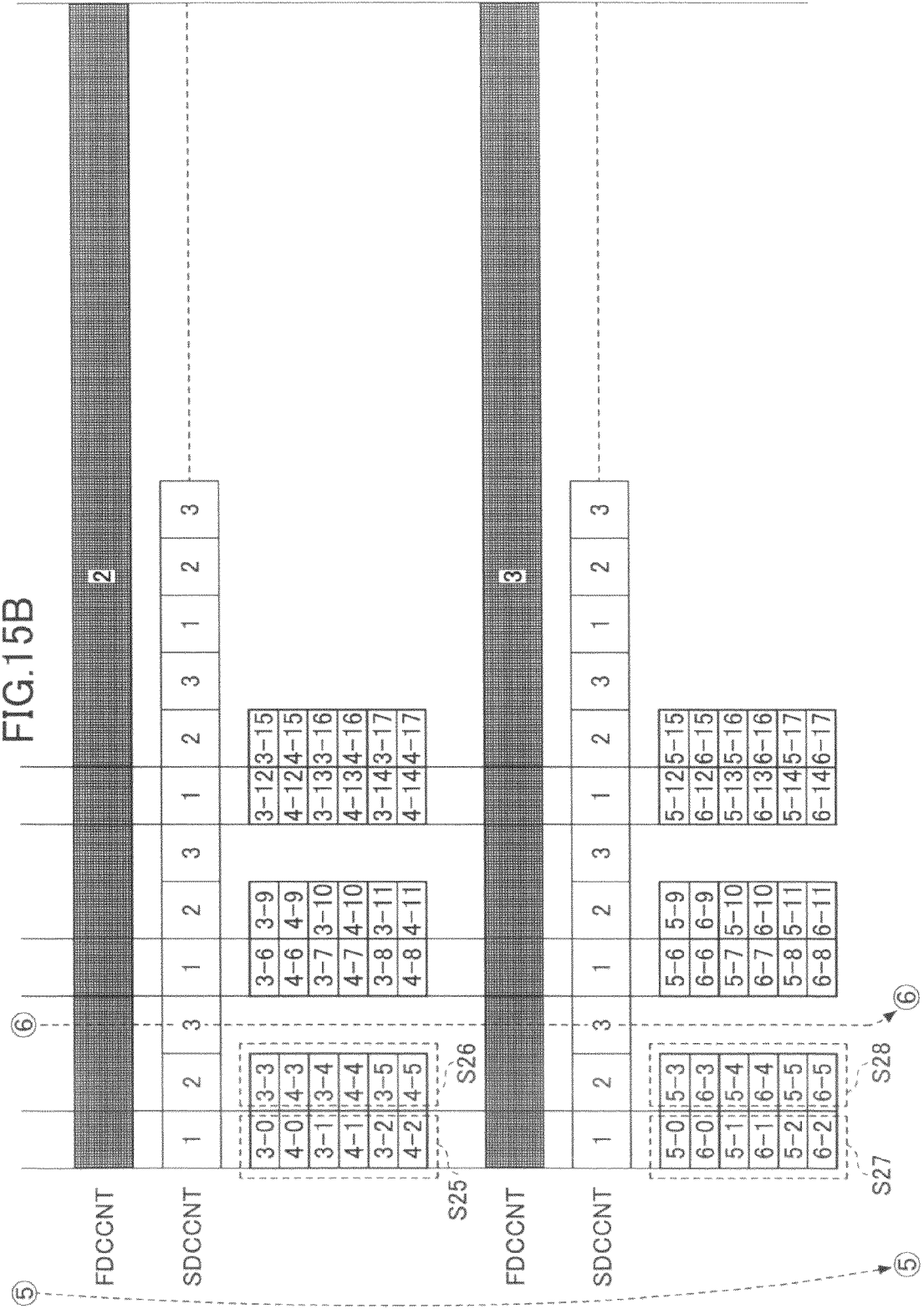

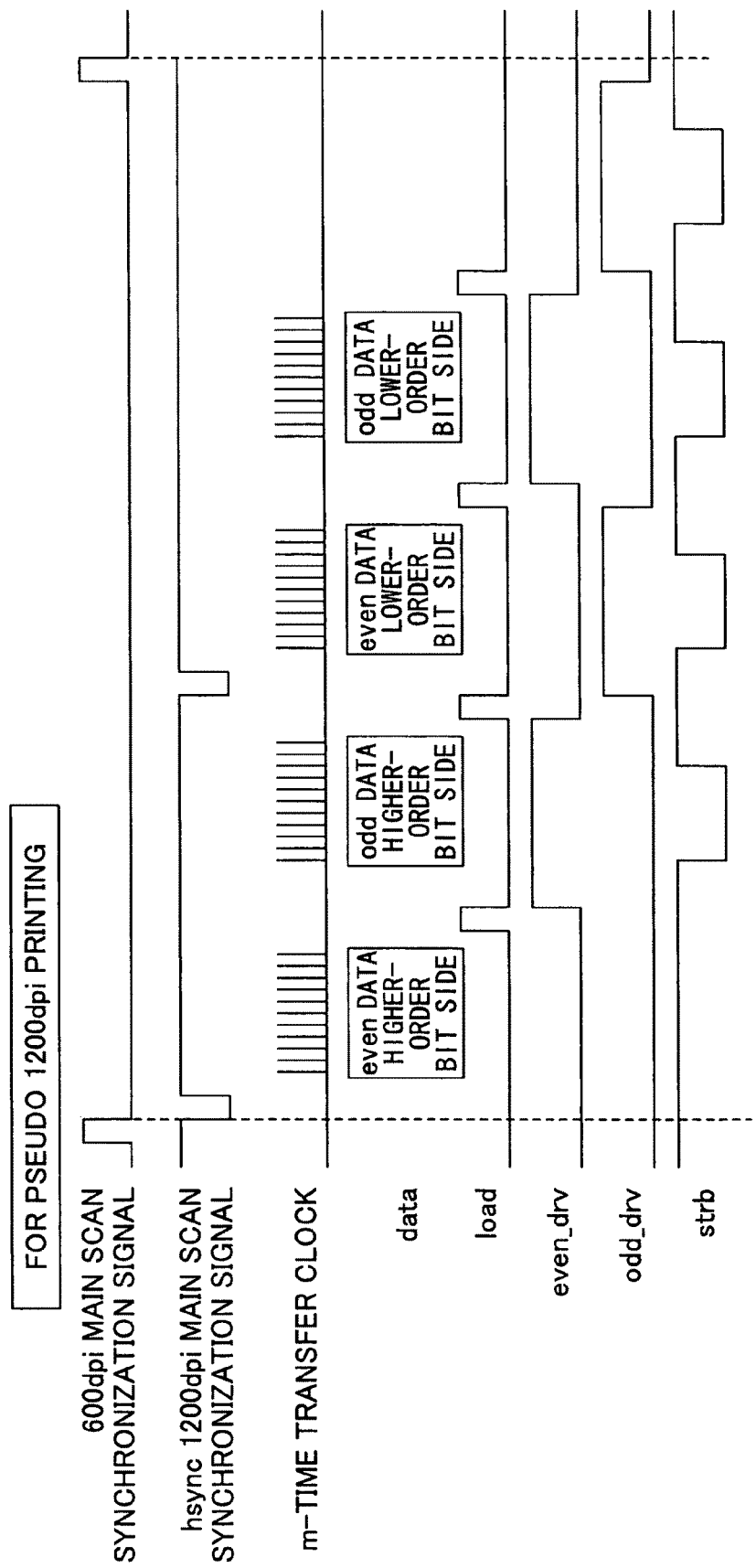

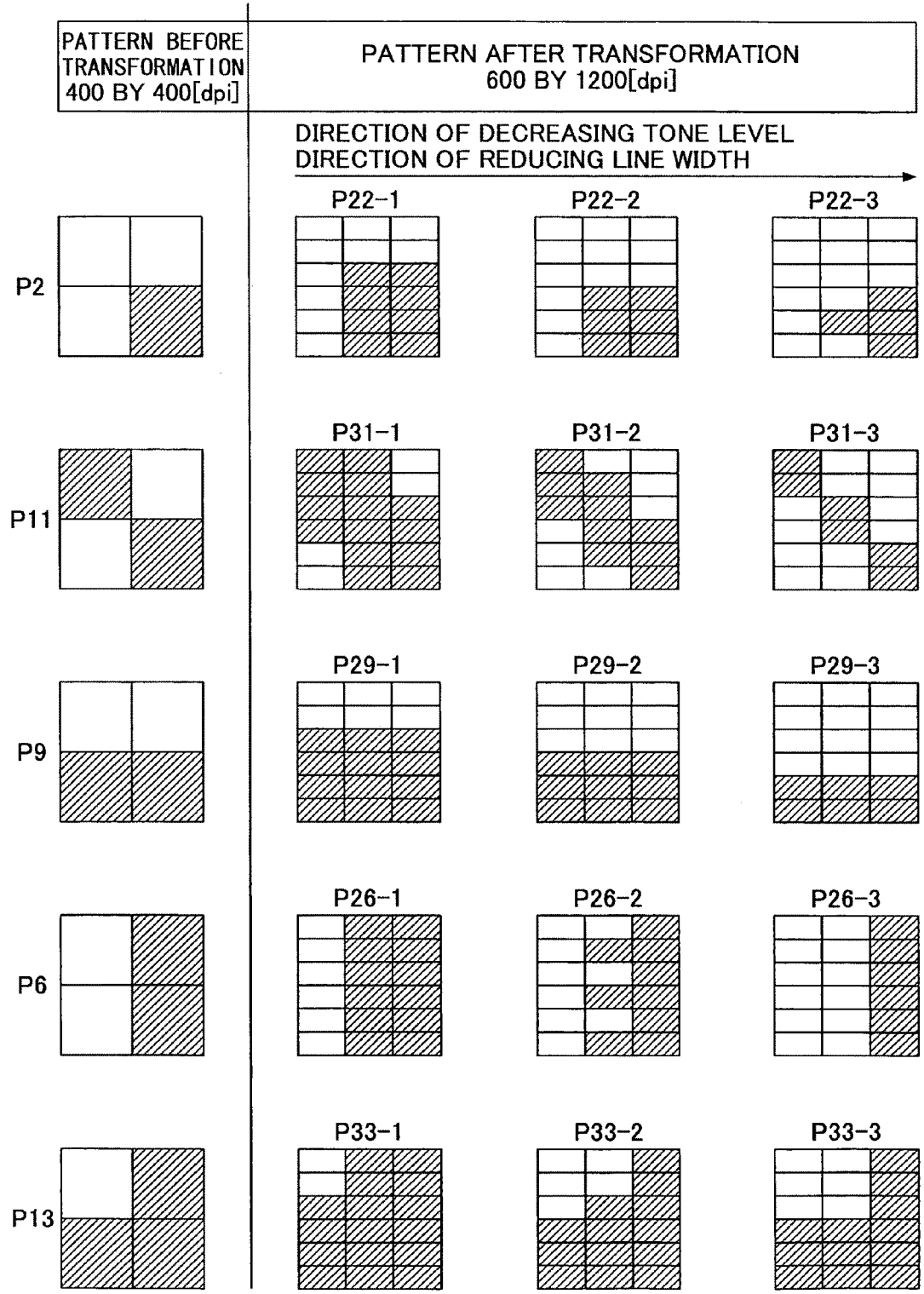

IMAGE WRITING UNIT, IMAGE FORMING APPARATUS, IMAGE WRITING METHOD AND COMPUTER-READABLE INFORMATION RECORDING MEDIUM

BACKGROUND OF THE INVENTION

1. Field of the Invention

The present invention relates to an image writing unit, an image forming apparatus, an image writing method and a computer-readable information recording medium, and in particular, to an image writing unit and an image writing method for making it possible to reduce possible degradation of image quality which may otherwise occur upon density transformation in an image forming apparatus in which a plurality of light emitting device array units (hereinafter simply referred to as LPHs (LED (Light Emitting Diode) Print Heads)) are arranged in a staggered manner, each of which has a length shorter than a length of a photosensitive body in a main scan direction, the image forming apparatus, and a computer-readable information recording medium storing an image writing program which causes a computer to perform the image writing method.

2. Description of the Related Art

For example, Japanese Laid-Open Patent Application No. 10-65907 discloses an art for reducing possible degradation in image quality which may otherwise occur upon density transformation in an image forming apparatus. According to the art, smoothing processing is carried out on input binary image data, and density increasing transformation is carried out suit that image density is increased predetermined integer times. Next, on binary image data thus having undergone the density increasing transformation, density reducing transformation is carried out such that image density is reduced predetermined integer times. Further, on binary image data thus having undergone the density reducing transformation, processing of reducing a line width is carried out. Image data thus having undergone the processing of reducing a line width is then output.

The above-mentioned art includes an art of a type of size change processing in which image density is increased 1.5 times such that image data of 400 dpi is transformed into image data of 600 dpi, in a so-called "wide machine" for an A0-size. In the size change processing, with the use of software, image density is changed 1.5 times in each of a main scan direction and a sub-scan direction. Because software is used as mentioned above, a considerable time may be required for the size change processing. Reduction of the required time is preferable.

In order to reduce the required time, the size change processing may be carried out with the use of hardware instead of software. Thereby, it may be possible to carry out the size change processing of changing image density 1.5 times in each of the main scan direction and the sub-scan direction approximately in a real-time manner. Thus, it may be possible to output image data having undergone the size change processing rapidly.

As the above-mentioned wide machine, an image forming apparatus which uses an LPH for multi-level exists. In the size change processing in the image forming apparatus, binary 400 dpi image data read from an image information storing unit is transformed into "multi-level" 600 dpi image data. In the image forming apparatus, it is possible to carry out the size change processing with reduced image quality degradation with the use of various 1.5-time density size change algorithms.

However, in such an image forming apparatus which uses an LPH for binary, size change processing may be carried out such that binary 400 dpi image data is transformed into "binary" 600 dpi image data. In this case, it is not possible to use middle-tone image data which is "multi-level" image data because the image forming apparatus uses "binary" image data as mentioned above. Further, when the size change processing is carried out with the use of a matrix pattern, a line width may vary in an image obtained from the size change processing, according to a position in a matrix of the matrix pattern. Therefore, a problem may occur such that image quality should be maintained when the size change processing of changing image density 1.5 times in each of the main scan direction and the sub-scan direction is carried out with the use of hardware at high speed.

Japanese Laid-Open Patent Application No. 2008-100468 discloses a related art.

SUMMARY OF THE INVENTION

An object of the present invention is to provide an image writing unit and an image writing method for solving the above-mentioned problem, carrying out size change processing at high speed, carrying out density transformation in each of a main scan direction and a sub-scan direction, and also, reducing possible image quality degradation such as variation in a line width in an image obtained from the size change processing, an image forming apparatus using the image writing apparatus, and a computer-readable information recording medium storing an image writing program for causing a computer to perform the image writing method.

The present invention will now be described. An art according to the present invention is used in an image forming apparatus. The image forming apparatus has a plurality of light emitting device array units each having a light emitting device array in which a plurality of light emitting devices are arranged in one direction and an image formation unit is provided which forms an image on a photosensitive body from light emitted by the light emitting device array. A length of each light emitting device array unit is shorter than a length of the photosensitive body in a main scan direction, and the plurality of the light emitting device array units are arranged along the main scan direction in a staggered manner, In the image forming apparatus, in a density transformation mode, a transformation pattern is used to transform image data for each matrix of n by n pixels, wherein, a rate of writing an image in a sub-scan direction is multiplied by m, and pixel density of image data written on the photosensitive body is multiplied by $(2B+1)/2$ in the main scan direction, and multiplied by $m(2B+1)/2$ in the sub-scan direction, where n denotes a positive integer, m denotes a positive integer and B denotes a positive integer. It is noted that, in an expression of a pixel matrix such as an "a" by "b" pixel matrix, "a" corresponds to the main scan direction and "b" corresponds to the sub-scan direction, throughout the specification.

In the density transformation mode, a transformation pattern, which is selected according to a position along the main scan direction at which an image is written with respect to a position of each of the plurality of light emitting device array units, is used to transform image data.

According to the present invention, as mentioned above, in the density transformation mode, a transformation pattern, which is selected according to a position along the main scan direction at which an image is written with respect to a position of each of the plurality of light emitting device array units, is used to transform image data. Accordingly, it is possible to avoid or reduce possible degradation in image quality which may otherwise occur because of a difference in image data transformation characteristics which may be caused by a difference in a position along the main scan direction at which an image is written on the photosensitive body with respective to each of the plurality of light emitting device array units.

Other objects, features and advantages of the present invention will become more apparent from the following detailed description when read in conjunction with the accompanying drawings.

BRIEF DESCRIPTION OF THE DRAWINGS

FIG. 5 depicts thinning carried out for a case of 1.5-time density transformation in the embodiment;

FIGS. 6A, 6B, 6C, 6D, 6E and FIGS. 7A, 7B, 7C, 7D, 7E depict timing charts of writing to line memories and reading from the line memories in a memory control unit (501-2) depicted in FIG. 4;

FIGS. 9A, 9B and 9C illustrate a state where a pattern matrix generation unit (801) latches input image data for two lines to generate a 2 by 2 pixel matrix;

FIG. 11 illustrates joint parts between the three LPHs;

FIG. 13 depicts a register map of registers for setting transformation patterns for divided zones;

FIG. 14 depicts a register map of registers for setting transformation patterns for joint parts;

FIGS. 15A, 15B and 15C illustrate a relationship of pixels between a 2 by 2 pixel matrix of input image data and a 3 by 6 pixel matrix of image data to be output;

FIGS. 16A and 16B illustrate operation of multiplying a rate of writing an image in a sub-scan direction m times (i.e., two times in the embodiment);

FIG. 17 illustrates an example of determining pixels depicted by rectangles filled with halftone dots in 3 by 6 pixel matrices depicted in FIG. 12A-12F.

DETAILED DESCRIPTION OF THE PREFERRED EMBODIMENTS

Figure 1A:
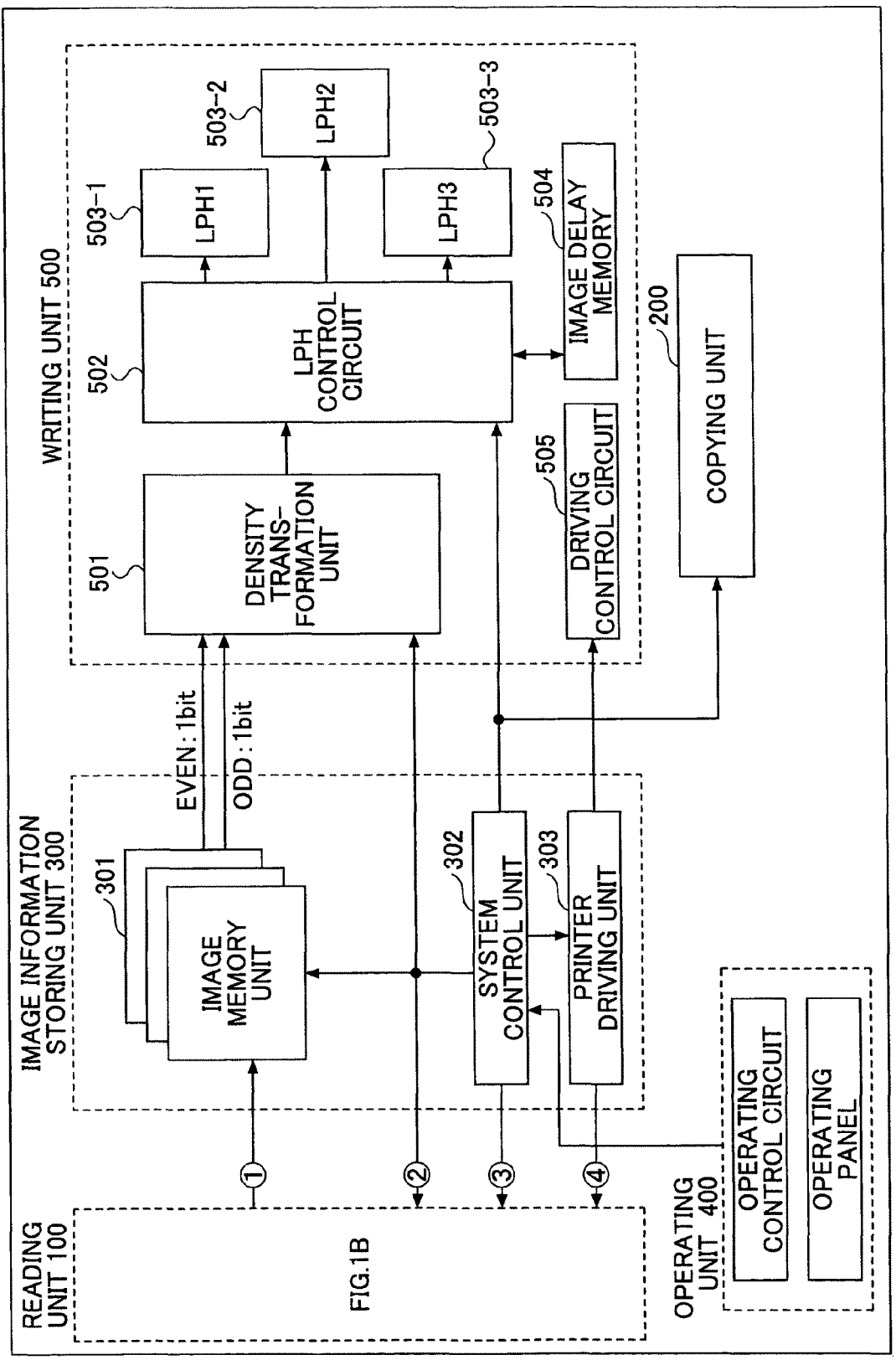
FIGS. 1A and 1B depict a block diagram of one example of functions of an image forming apparatus including an image writing unit (i.e., a writing unit 500) in one embodiment.

Embodiments will now be described.

An image writing unit in one embodiment uses LPHs for binary, used in an image forming apparatus which has a function to form an image to an A0-size sheet. In the image forming apparatus, the plurality of LPHs are arranged in a staggered manner along a main scan direction. Each LPH has a length shorter than a photosensitive body of the image forming apparatus.

In the image writing unit, image data is transferred to the LPHs at a transfer rate X, and respective light emitting devices of the LPH are driven. A density transformation mode is provided in the image writing unit in which image data is transferred to the LPHs at a transfer rate mX which is m times the above-mentioned transfer rate X, and a density of binary image data of A [dpi] is transformed into a density of (2B+1)/2 times in the main scan direction and m(2B+1)/2 time in the sub-scan direction, where each of n, m and B denotes a positive integer, and image data thus processed is output. When the density transformation mode is selected, an image height position (i.e., a position along the main scan direction) of image data currently processed is recognized. Then, binary data of A [dpi] by A [dpi] is stored in k memories (k denotes a positive integer) for k lines of image data. Then, pattern recognition is carried out for each n by n pixel matrix with the use of image data read from n memories of the k memories. Then, with the use of a transformation pattern prepared for the current image height, density transformation is performed on the n by n pixel matrix of image data for n(2B+1)/2 by mn(2B+1)/2 pixel matrix of image data. Thus, as image data having undertone the density transformation, image data of [(2B+1)/2]A [dpi] by [m(2B+1)/2]A [dpi] is obtained. Then, the image data having undergone the density transformation is transferred to the LPHs at the transfer rate mX for the sub-scan direction.

The above-mentioned image writing unit recognizes, for image data currently undergoing the density transformation, which one of the plurality of LPHs is used to write an image on the photosensitive body. Then, a transformation pattern determined according to a result of the recognition is selected.

The number of LPHs may be determined freely. An embodiment is also possible in which a single LPH for a A0 size is used to write an image to a photosensitive body.

Further, during the density transformation, the image writing unit may recognize that image data currently processed corresponds to image data corresponding to a joint part between LPHs, and a transformation pattern which is determined according to a result of the recognition is selected.

Further, during the density transformation, the image writing unit recognizes an image height position on the photosensitive body at which an image concerning image data currently processed is written, and a transformation pattern which is determined according to a result of the recognition is selected.

When recognizing an image height on the photosensitive body at which an image is written, it is determined which one of divided zones image data belongs. It is noted that one line is divided into a plurality of zones, and thus, the divided zones are obtained.

An image writing method in one embodiment uses LPHs for binary, is used in an image forming apparatus which has a function to form an image to an A0-size sheet. In the image forming apparatus, the plurality of LPHs are arranged in a staggered manner along a main scan direction. Each LPH has a length shorter than a photosensitive body of the image forming apparatus.

In the image writing method, image data is transferred to the LPHs at a transfer rate X, and respective light emitting devices of the LPHs are driven. A density transformation mode is provided in which image data is transferred to the LPHs at a transfer rate mX which is m times the above-mentioned transfer rate X, and a density of binary image data of A [dpi] is transformed into a density of (2B+1)/2 times in the main scan direction and a density of m(2b+1)/2 in the sub-scan direction, where each of m and B denotes a positive integer, and image data thus processed is output. When the density transformation mode is selected, an image height position (i.e., a position along the main scan direction) of image data currently processed is recognized. Then, binary data of A [dpi] by A [dpi] is stored in k memories (k denotes a positive integer) for k lines of image data. Then, pattern recognition is carried out for each n by n pixel matrix generated with the use of image data read from n memories of the k memories. Then, with the use of a transformation pattern prepared for the current image height, density transformation is performed on the n by n pixel matrix of image data into n(2B+1)/2 by mn(2B+1)/2 pixel matrix of image data. Thus, as image data having undertone the density transformation, image data of [(2B+1)/2]A [dpi] by [m(2B+1)/2]A [dpi] is obtained. Then, the image data having undergone the density transformation is transferred to the LPHs at the transfer rate mX for the sub-scan direction.

An image forming apparatus in one embodiment uses the above-mentioned image writing unit or the image writing method to form an electrostatic latent image on the photosensitive body by causing the LPHs to emit light to the photosensitive body, develops the electrostatic latent image into a toner image, and transfers the toner image to a sheet-shaped recording medium.

A computer-readable information recording medium in one embodiment stores an image writing program which causes a computer to perform an image writing method which uses LPHs for binary, used in an image forming apparatus which has a function to form an image to an A0-size sheet. In the image forming apparatus, the plurality of LPHs are arranged in a staggered manner along a main scan direction. Each LPH has a length shorter than a photosensitive body of the image forming apparatus.

The image writing program causes the computer to perform the image writing method, in which image data is transferred to the LPHs at a transfer rate X, and respective light emitting devices of the LPHs are driven. A density transformation mode is provided in which image data is transferred to the LPHs at a transfer rate mX which is m times the above-mentioned transfer rate X, and a density of binary image data of A [dpi] is transformed into a density of (2B+1)/2 times in the main scan direction, and m(2B+1)/2 in the sub-scan direction where each of m and B denotes a positive integer, and image data thus processed is output. When the density transformation mode is selected, an image height position (i.e., a position along the main scan direction) of image data currently processed is recognized. Then, binary data of A [dpi] by A [dpi] is stored in k memories (k denotes a positive integer) for k lines of image data. Then, pattern recognition is carried out for each n by n pixel matrix generated with the use of image data read from n memories of the k memories. Then, with the use of a transformation pattern prepared for the current image height, density transformation is performed on the n by n pixel matrix of image data into n(2B+1)/2 by mn(2B+1)/2 pixel matrix of image data. Thus, as image data having undertone the density transformation, image data of [(2B+1)/2]A [dpi] by [m(2B+1)/2]A [dpi] is obtained. Then, the image data having undergone the density transformation is transferred to the LPHs at the transfer rate mX for the sub-scan direction.

According to each embodiment, it is possible to carry out image data size change processing in the main scan direction and the sub-scan direction at high speed, and also, it is possible to reduce possible image degradation such as a variation in a line width in the main scan direction on an image obtained through density transformation carried out in the image data size change processing.

It is noted that, in an embodiment described below, the above-mentioned density transformation such that image data of A[dpi] by A [dpi] is transformed into image data of [(2B+1)/2.]A [dpi] by [m(2B+1)/2]A [dpi] corresponds to "1.5-time density transformation". In the 1.5-time density transformation, the above-mentioned respective constants are as follows: m=2, n=2, A=400 [dpi] and B=1. Therefore, in the 1.5-time density transformation, image data of 400 [dpi] by 400 [dpi] is transformed into 600 [dpi] (main scan direction) by 1200 [dpi] (sub-scan direction). It is noted that, when pixel density is multiplied by 1.5 for each of both main scan direction and sub-scan direction, image data of 400 [dpi] by 400 [dpi] is transformed into 600 [dpi] by 600 [dpi]. However, according to the embodiment, for the purpose of improving resolution in the sub-scan direction, the pixel density along the sub-scan direction is further multiplied by "m", i.e., "2" in the embodiment. As a result, in the embodiment, as mentioned above, image data of 400 [dpi] by 400 [dpi] is transformed into 600 [dpi] (main scan direction) by 1200 [dpi] (sub-scan direction). At this time, as will be described later with reference to FIGS. 16A and 16B, so-called "pseudo 1200 dpi printing method" is applied.

Now, an image writing unit, an image forming apparatus and an image writing method in embodiments, will be described in detail with reference to figures.

Figure 1B:
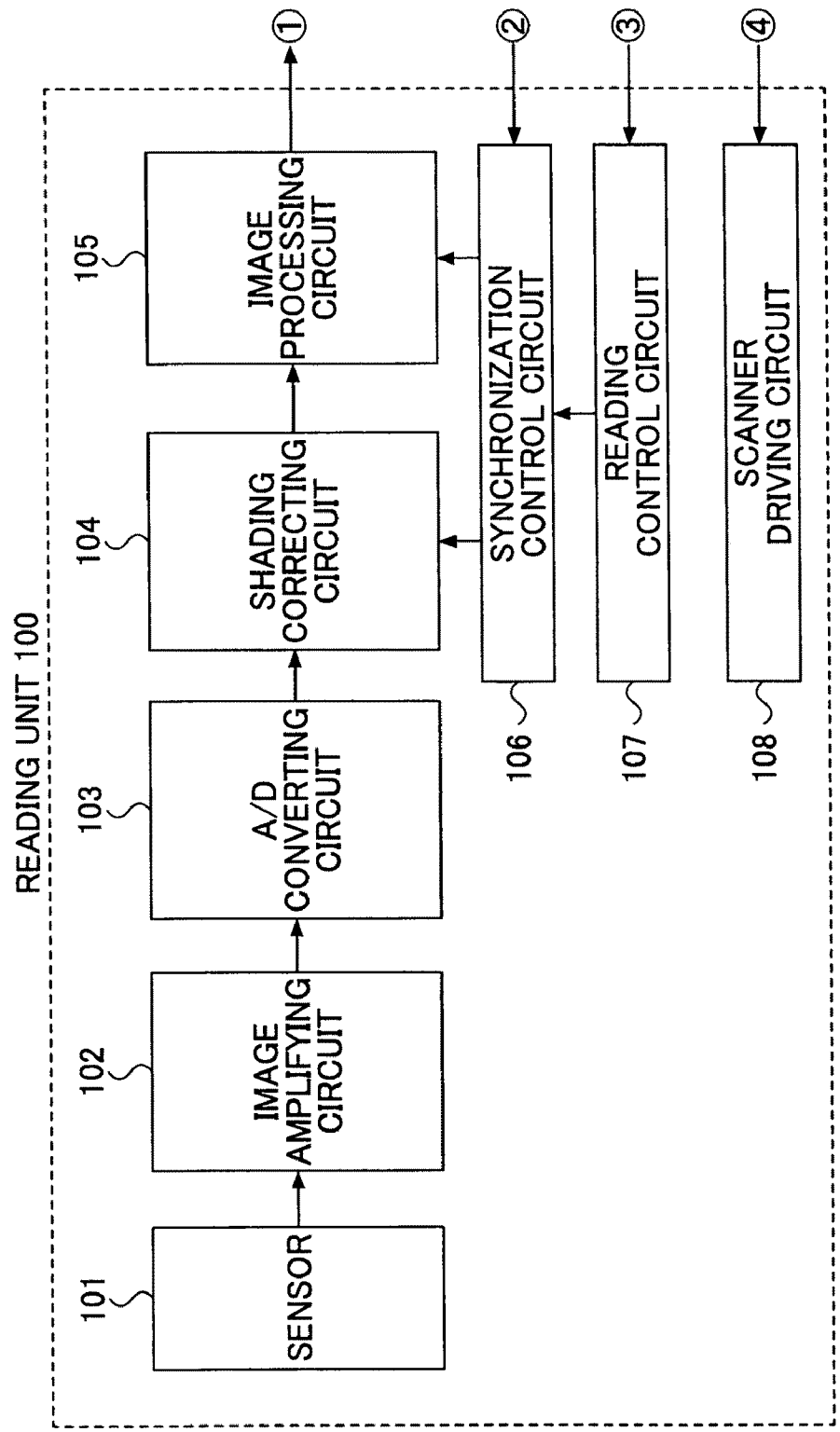
Figure 2:
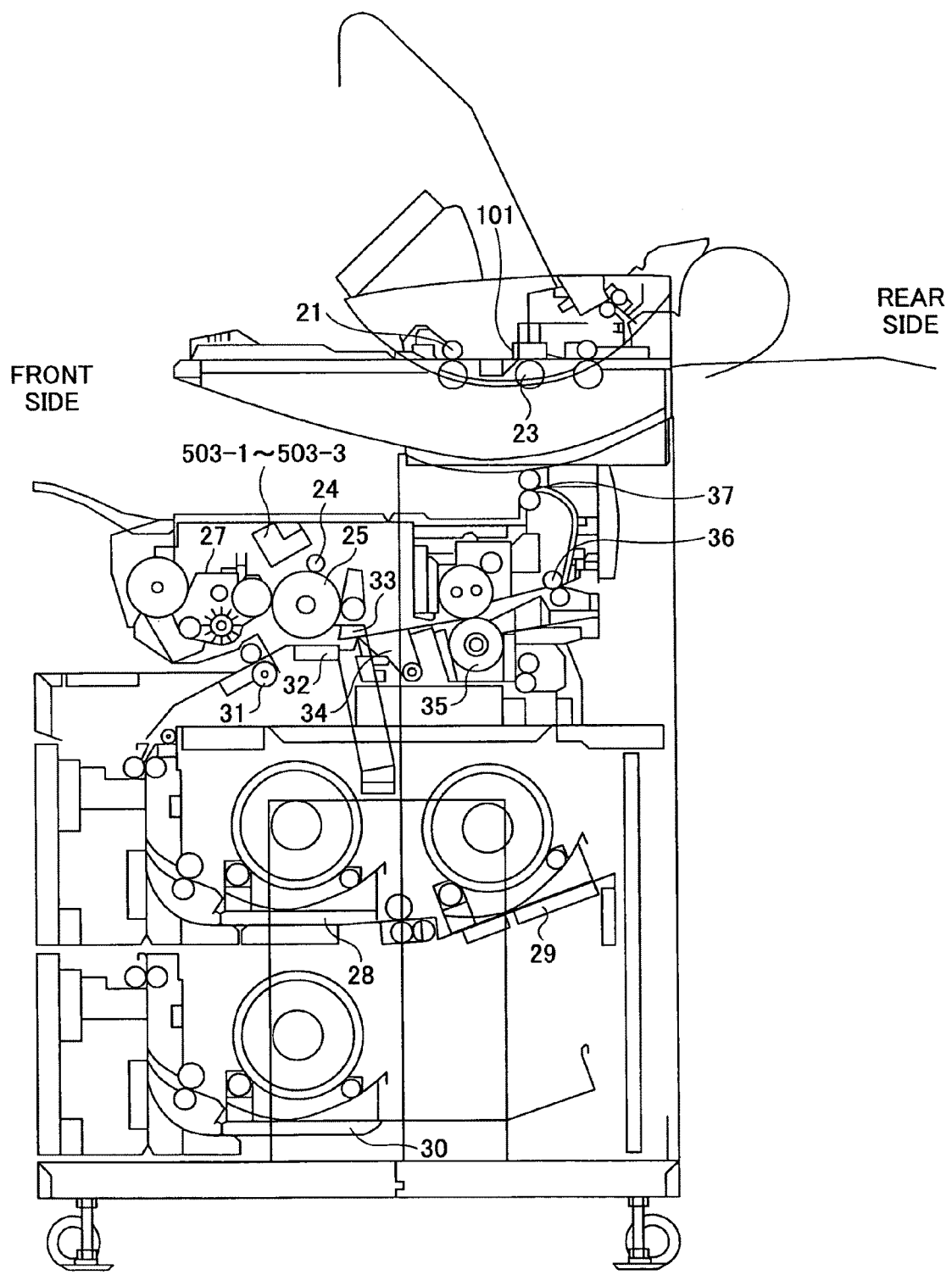
FIG. 2 depicts an example of a hardware configuration of the image forming apparatus depicted in FIG. 1.

FIGS. 1A and 1B depict a block diagram of one example of a function configuration of an image forming apparatus including an image writing unit (i.e., a writing unit 500) in one embodiment. FIG. 2 depicts one example of a hardware configuration of the image forming apparatus including the image writing unit in the embodiment.

The image forming apparatus in FIGS. 1A and 1B includes an original reading unit 100 for reading an original, an image information storing unit 300 for storing thus-read information of the original, a copying unit 200 which carries out a series of operations for copying an image based on the information of the original to a transfer paper sheet, a system control unit 302 which controls these units, an operating unit 400 for an operator to input data or such with the use of keys or such, and the above-mentioned writing unit 500.

The original reading unit 100 includes a contact sensor 101, an image amplifying circuit 102, an A/D converting circuit 103, a shading correcting circuit 104, an image processing circuit 105, a synchronization control unit 106, a reading control circuit 107 and a scanner driving circuit 108.

Next, a configuration of the original reading unit 100 will be described with reference to FIGS. 1A, 1B and 2.

In an example depicted in FIG. 2, when an operator inserts an original to the image forming apparatus, the original is conveyed through between the contact sensor 101 and a white roller 23 as a result of the roller 21 rotating. Light is emitted to the original thus being conveyed, from an LED device of the contact sensor 101, and image data of the original is read as a result of reflected light from the original being used to form an image on the contact sensor 101.

The contact sensor 101 converts the image of the original formed on the contact sensor 101 into an analog electric signal. The analog electric signal is then amplified by the image amplifying circuit 102. The A/D converting circuit 103 converts the analog electric signal into a multi-level digital image signal for each pixel. The multi-level digital image signal is then output in synchronization with a clock signal output from the synchronization control circuit 106, and is corrected by the shading correcting circuit 104 for a distortion caused by a light amount variation in the LED device of the contact sensor 101, a sensitivity variation in the contact sensor 101, or such.

The digital image signal thus corrected by the shading correcting circuit 104 is converted into digital recording image data (simply referred to as "image data" hereinafter) by the image processing circuit 105, and is then written in an image memory unit 301 of the image information storing unit 300. The reading control circuit 107 controls the synchronization control circuit 106 in the original reading unit 100 and the scanner driving circuit 108 which drives motors rotating a roller 21, the white roller 23 and so forth of the original reading unit 100.

Next, configurations of the system control unit 302 which controls a series of operations for forming an image on a transfer paper sheet from the image data written in the image memory unit 301, and the writing unit 500 will be described.

The system control unit 302 has a function of controlling the entirety of the image forming apparatus, controlling the reading control circuit 107, the synchronization control circuit 106, the image memory unit 301 and a density transformation unit 501, and controlling transfer of image data through a LPH control circuit 502 which acts as a LED writing control circuit. Further, the system control unit 302 drives motors and so forth through a printer driving unit 303, a driving control circuit 505, and the scanner driving circuit 108. Thus, the system control unit 302 controls the image forming apparatus such that the original and the transfer paper sheet can be smoothly conveyed in the image forming apparatus.

The density transformation unit 501 of the writing unit 500 receives the signal indicating the image data (which may be simply referred to as an "image signal" hereinafter) transferred in synchronization with a synchronization clock signal from the image memory part 301, and transfers the image signal to the LPH control circuit 502 as it is or after carrying out density transformation. The LPH control circuit 502 performs image correcting processing as is necessary on the received image signal, and then, transmits the image signal to the three LPHs 503-1 through 503-3 after dividing the image signal for the three LPHs. The LPHs 503-1 through 503-3 convert the image signals into light, and emit the light to a photosensitive body 25 depicted in FIG. 2.

Next, with reference to FIG. 2, an image formation process carried out by the image forming apparatus in the embodiment will be described.

A charging unit 24 is called a scorotron charger having a grid for uniformly charging the drum-shaped photosensitive body 25 acting as an image carrying body, to −2500 V. The photosensitive body 25 is rotated by a motor not depicted.

In each LPH of the three LPHs 503-1 through 503-3, a plurality of LEDs are arranged linearly to form an array in a main scan direction. Based on image data provided from the LPH control circuit 502, the LED devices of each of the LPHs 503-1 through 503-3 emit light. The light irradiates the photosensitive body 25 through a Selfoc lens array which is an optical device (i.e., an image formation unit) and is included in each LPH.

When the photosensitive body 25 is irradiated by the LPHs 503-1 through 503-3 based on image data after being charged by the charger 24, charges on a surface of the photosensitive body 25 disappear at positions at which the positive body 25 is thus irradiated as a result of the charges flowing toward the ground because of photoconductive effect. It is noted that in the LPHs 503-1 through 503-3, LED devices do not emit light for image data which has light tone and LED devices emit for image data which has dark tone. As a result, on the photosensitive body 25, an electrostatic latent image reflecting dark and light tones of the image data is formed. The electrostatic latent image on the photosensitive body 25 is then developed by a developing unit 27, and thus, a toner image is formed. In the developing unit 27, a bias of −700 V is applied, and inside toner is stirred and charged to have a negative potential. Therefore, the toner adheres to the photosensitive body 25 only at positions at which the photosensitive body 25 has been irradiated by the LPHs 503-1 through 503-3.

On one hand, a transfer paper sheet as a sheet-shaped recording medium is fed to a registration roller 31 selectively from three paper feeding units 28 through 30 and a manual inserting unit, is then fed by the registration roller 31, and passes below the photosensitive body 25. At this time, a transfer charger 32 transfers the toner image to the transfer paper sheet from the photosensitive body 25, the transfer paper sheet is then separated from the photosensitive body 25 by a separating charger 33, is then fed to a fixing unit 35 by a conveying tank 34. The fixing unit 35 then fixes the toner image to the transfer paper sheet. The transfer paper sheet to which the toner image is thus fixed is then ejected to the outside of the image forming apparatus via paper ejecting rollers 36 and 37.

Figure 3:
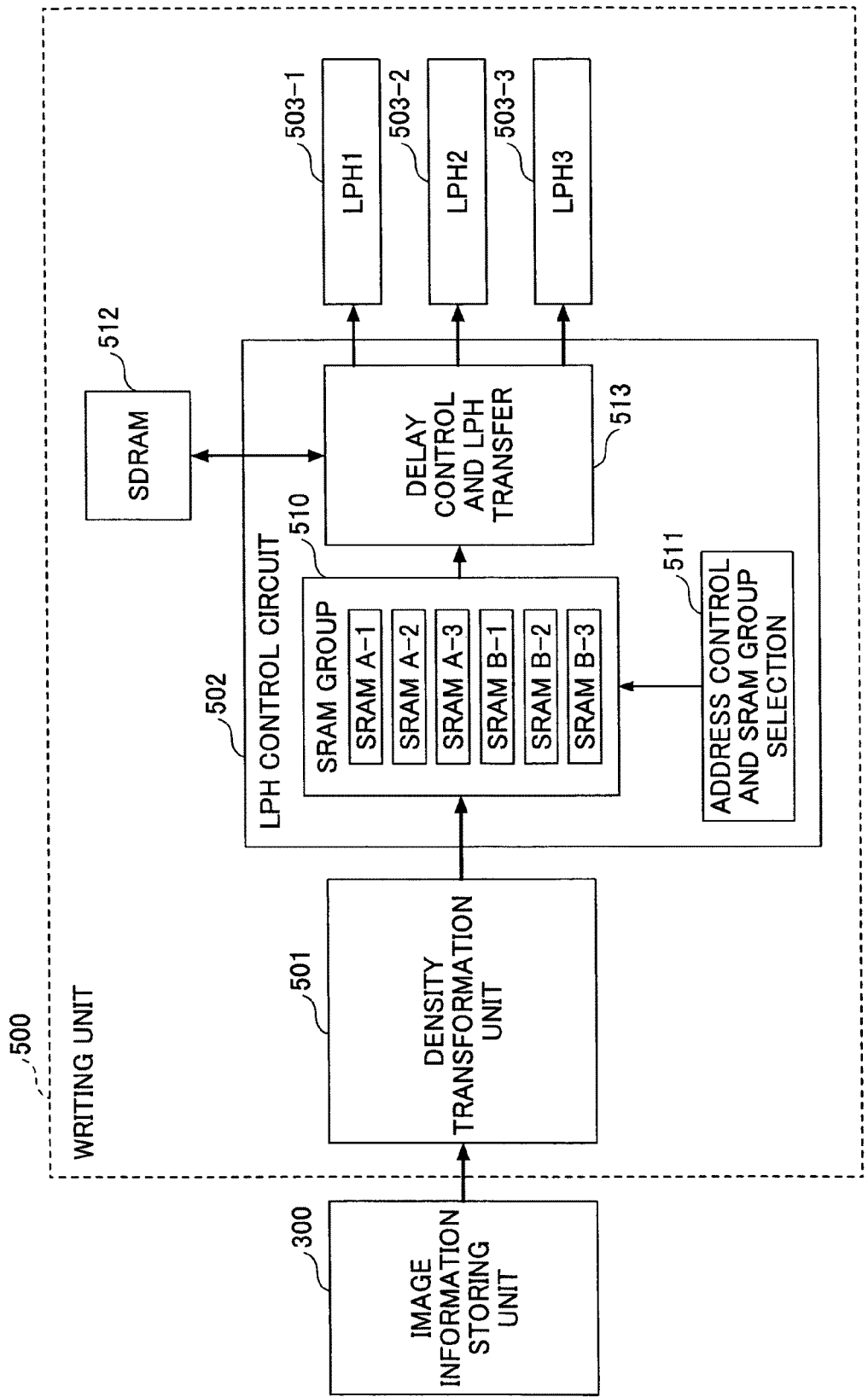
FIG. 3 depicts a block diagram of a writing unit depicted in FIG. 1.

Next, a flow of image data in the writing unit 500 depicted in FIG. 1 will be described. FIG. 3 depicts a block diagram of a configuration of the writing unit 500.

Figure 10:
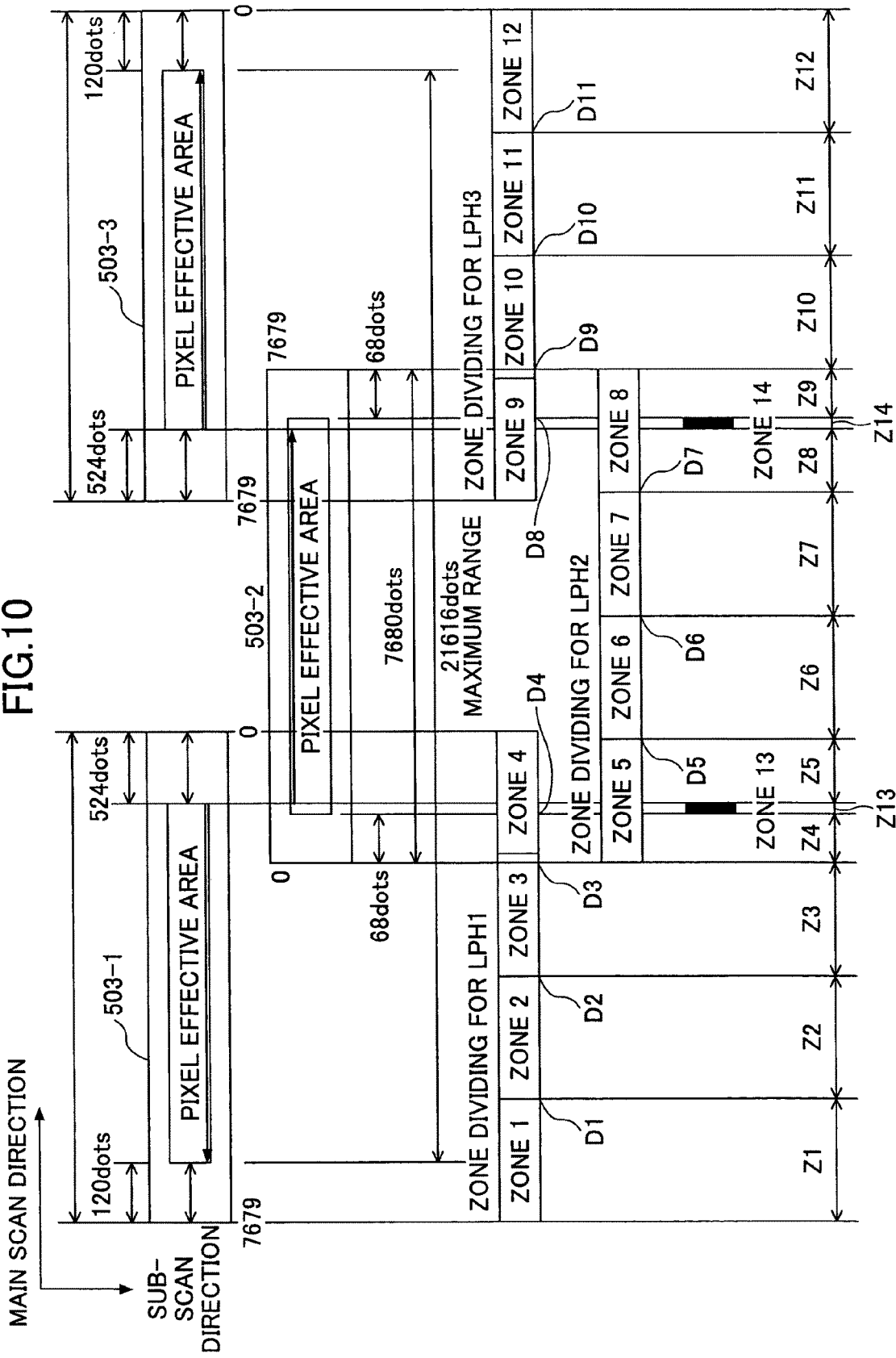
FIG. 10 illustrates a method for dividing 1 line of image data for three LPHs.

The writing unit 500 includes the density transformation unit 501, the LPH control circuit 502, the LPHs 503-1 through 503-3 and a SDRAM for delay 512. The three LPHs 503-1 through 503-3 are arranged in a staggered manner as depicted in FIG. 10 in which positions thereof in the sub-scan direction are different therebetween.

In the writing unit 500, image data is transferred from the image information storing unit 301. In the transfer of image data, an even-th bit and an odd-th bit are transferred simultaneously. Image data thus transferred is first processed by the density transformation unit 501 which carries out pattern recognition and outputs coded 2-bit image data. In SRAM group 510 included in the LPH control circuit 502, one line of the image data is written to three SRAMs A-1 through A-3 in a A group in a divided manner. It is noted that a "line of image data" generally corresponds to a line of pixels arranged along the main scan direction written by the LPHs 503-1 through 503-3 on the photosensitive body 25. A collection of lines of pixels, each line of which is thus written on the photosensitive body 25, successively as a result of the photosensitive body 25 rotating in the sub-scan direction, form a page of image.

Next, the line of the image data thus written in the three SRAMs A-1 through A-3 in the A group is read simultaneously. During this time, next line of the image data is written in the other three SRAMs B-1 through B-3 in a B group in the same manner. That is, toggling operation is carried out between the SRAMs A-1 through A-3 in the A group and the SRAMs B-1 through B-3 in the B group.

An address control and SRAM group selection circuit 511 depicted in FIG. 3, which controls selection of the respective SRAMs in the SRAM group 510, controls writing of the image data to and reading the image data from the respective SRAMs of the SRAM group 510.

The image data read from the SRAM group 510 is once transferred to a SDRAM 512, and then, is read from the SDRAM 512. At this time, since the positions of the LPHs 503-1 through 503-3 are different in the sub-scan direction as mentioned above, the image data for the LPHs 503-2 and 503-3 is to be read with delays corresponding to the differences in the positions in the sub-scan direction with respect to the image data for the LPH 503-1, under the control of a delay control and LPH transfer unit 513 depicted in FIG. 3 which controls data transfer to the LPHs. Consequently, the image data is thus transferred to the LPHs 503-1 through 503-3.

Figure 4:
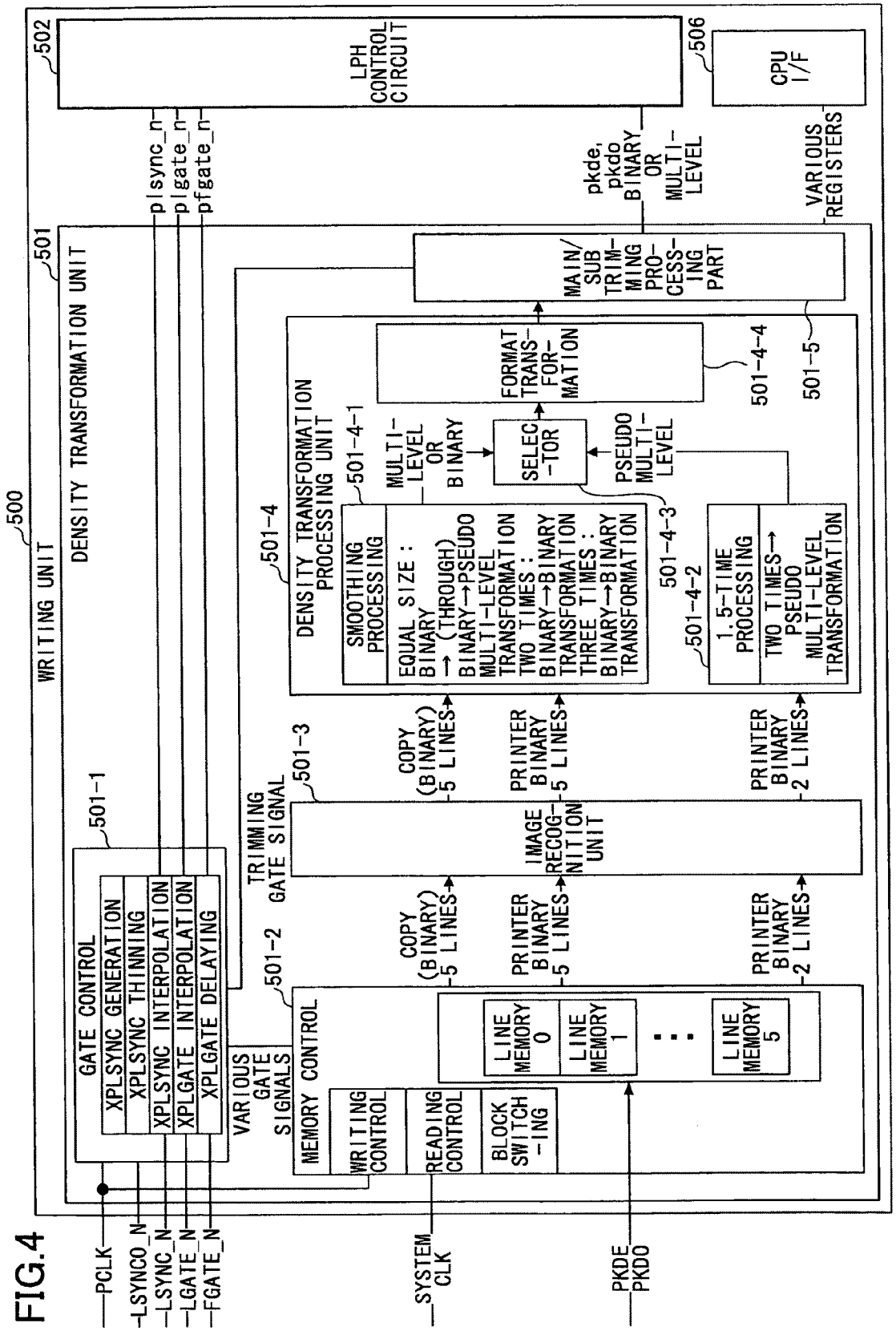
FIG. 4 depicts a block diagram of a density transformation unit depicted in FIG. 3.

Next, the density transformation unit 501 depicted in FIG. 3 will be described. FIG. 4 depicts a block diagram of a configuration of the density transformation unit 501.

As depicted in FIG. 4, the density transformation unit 501 includes a GATE control unit 501-1, a memory control unit 501-2, an image recognition unit 501-3, a density transformation processing unit 501-4, and a main/sub trimming processing unit 501-5.

A density transformation mode of the density transformation unit 501 is set by a register dense_r[2:0] not depicted, from a CPU I/F 506 depicted in FIG. 4. The register dense_r [2:0] has a value selected from among 0, 1, 2, 3 and 4. When the value is 0, a density transformation mode is set as "through mode". When the value is 1, a density transformation mode is set as "basic density mode". When the value is 2, a density transformation mode is set as "two times density mode". When the value is 3, a density transformation mode is set as "three times density mode". When the value is 4, a density transformation mode is set as "1.5-time density mode". The four modes other than the "1.5-time density mode", i.e., "through mode", "basic density mode", "two times density mode" and "three times density mode" may be generally referred to as "print modes".

The GATE control unit 501-1 carries out processing according to the set density transformation mode. Specifically, the GATE control unit 501-1 generates a signal LSYNC0_N which is a line synchronization signal to be sent to the image memory unit 301 of the image information storing unit 300. Further, in a case of the "1.5-time density mode", the above-mentioned line synchronization signal is thinned, as will be described later with reference to FIG. 5. Therefore, when the line synchronization signal is sent to the LPH control circuit 502, the line synchronization signal is interpolated beforehand. Further, the GATE control unit 501-1 also generates a dummy FGATE signal other than the above-mentioned line synchronization signal.

FIG. 5 illustrates the thinning of the line synchronization signal for the case where a density transformation mode is set as the "1.5-time density mode".

A waveform depicted on top of FIG. 5 denotes the above-mentioned line synchronization signal to be sent to the image information storing unit 300 in a case where a density transformation mode is set as the "1.5-time density mode" for a pixel density of 600 dpi. In the case of the "1.5-time density mode", as will be described later with reference to FIGS. 9 and 10, two lines of image data (i.e., a 2 by 2 pixel matrix of image data) is received and three lines of image data is generated (i.e., a 3 by 6 pixel matrix of image data with "pseudo 1200 dpi printing way" for processing within a period of three lines). Therefore, in order that, after two lines of image data is received, next line of image data should not be taken, the line synchronization signal is thinned as mentioned above, as defined by ovals in FIG. 5. As depicted at the bottom of FIG. 5, the line synchronization signal once thinned as mentioned above is then interpolated into the original state, and then, is sent to the LPH control circuit 502.

Next, the memory control unit 501-2 will be described. The memory control unit 501-2 generates a pixel matrix according to a density transformation mode set by the above-mentioned register dense_r[2:0]. The memory control unit 501-2 has the following functions:

(a) Writing of Masked Data:

Reading of image data from a line memory and writing image data to a line memory are carried out in parallel for two pixels, i.e., an even-th pixel and an even-th pixel. That is, one line of image data of 21600 pixels are written in the line memory of addresses of 0 through 10799 and a width of 2 bits, in synchronization with a synchronization signal PLSYNC_N. Then, when a PFGATE_N signal and a PLGATE_N signal not depicted indicating whether to write image data (i.e., whether to output to the LPHs 503-1 through 503-3) are not asserted, masked data is written in the line memory. Masked data means data of "0". Further, when asserting of the PLGATE_N signal has not occurred up to 32 clock pulses from a time of the PLSYNC_N signal, writing to the line memory is forcibly started. Thereby, before the PFGATE_N signal is asserted, six line memories 0 through 5 are filled with masked data.

(b) Writing of Image Data:

During an interval in which the PFGATE_N signal and the PLGATE_N signal are enable states, the masking is canceled (i.e., masked data is not used), and given image data is written in the line memory as it is.

(c) Reading of Image Data and Generating an Image Matrix:

In synchronization with a synchronization signal plsync_n (i.e., a synchronization signal of 600 dpi as a result of the above-mentioned interpolation being performed on the PLSYNC_N signal), the image data is read from the line memory.

A size of an image matrix according to a density transformation mode is as follows: In a case of each of "basic density mode" and "through mode", a 5 by 5 pixel matrix is used. In a case of the "1.5-time density mode", a 2 by 2 pixel matrix is used. A 2 by 2 pixel matrix is generated as a result of image data being read from 2 line memories of 5 line memories other than a line memory in which image data is currently written. For example, in a case where image data is currently written in a first line memory, a first line of a 2 by 2 pixel matrix is obtained from image data read from a fourth line memory, and a second line of the 2 by 2 pixel matrix is obtained from image data read from a fifth line memory.

FIGS. 6A, 6B, 6C, 6D and 6E and FIGS. 7A, 7B, 7C, 7D and 7E depict timing charts of reading from the line memories and writing to the line memories in the memory control unit 501-2 mentioned above, for a case of 1.5-time density transformation.

Figure 6C:
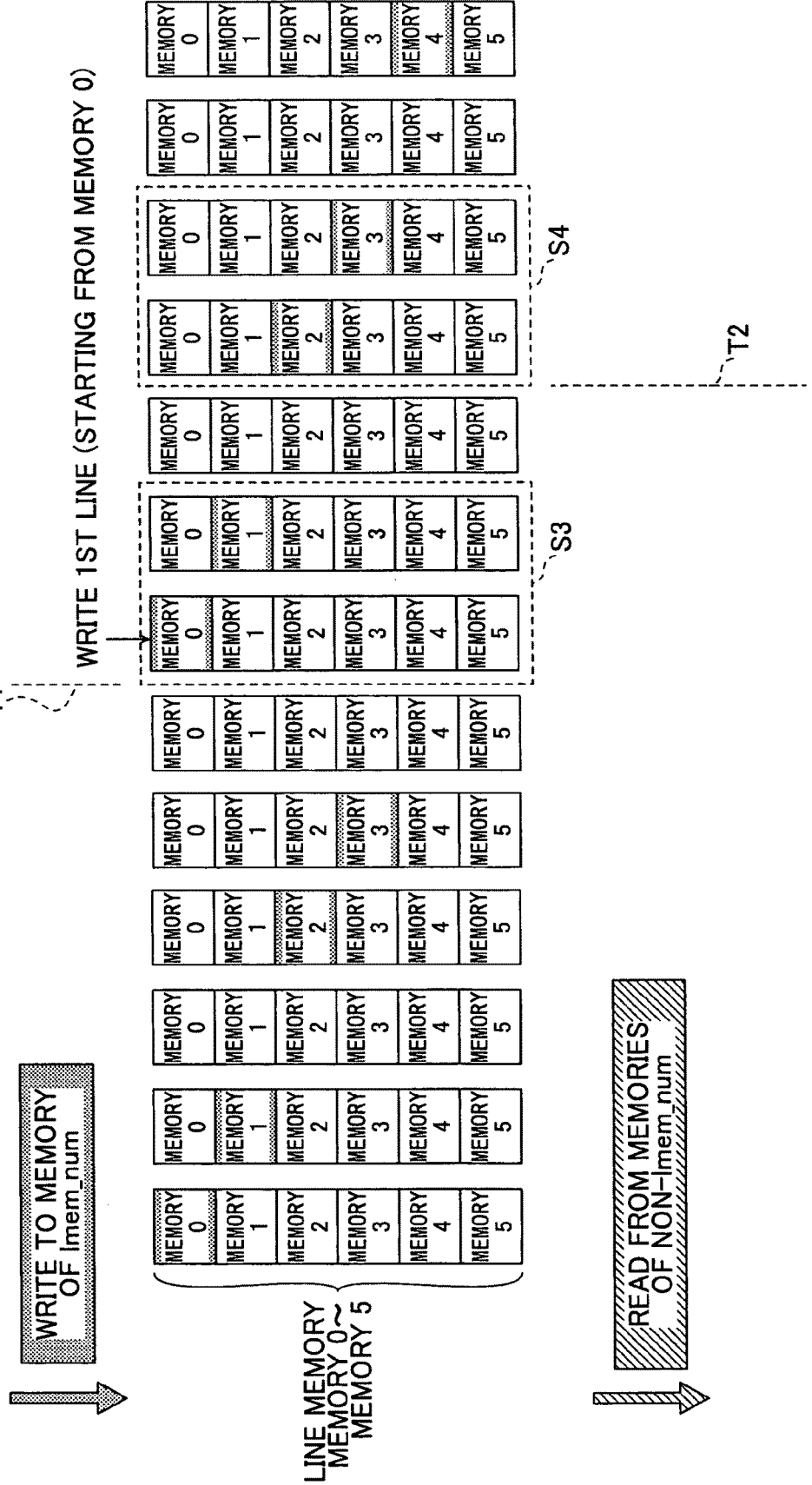
Figure 6D:
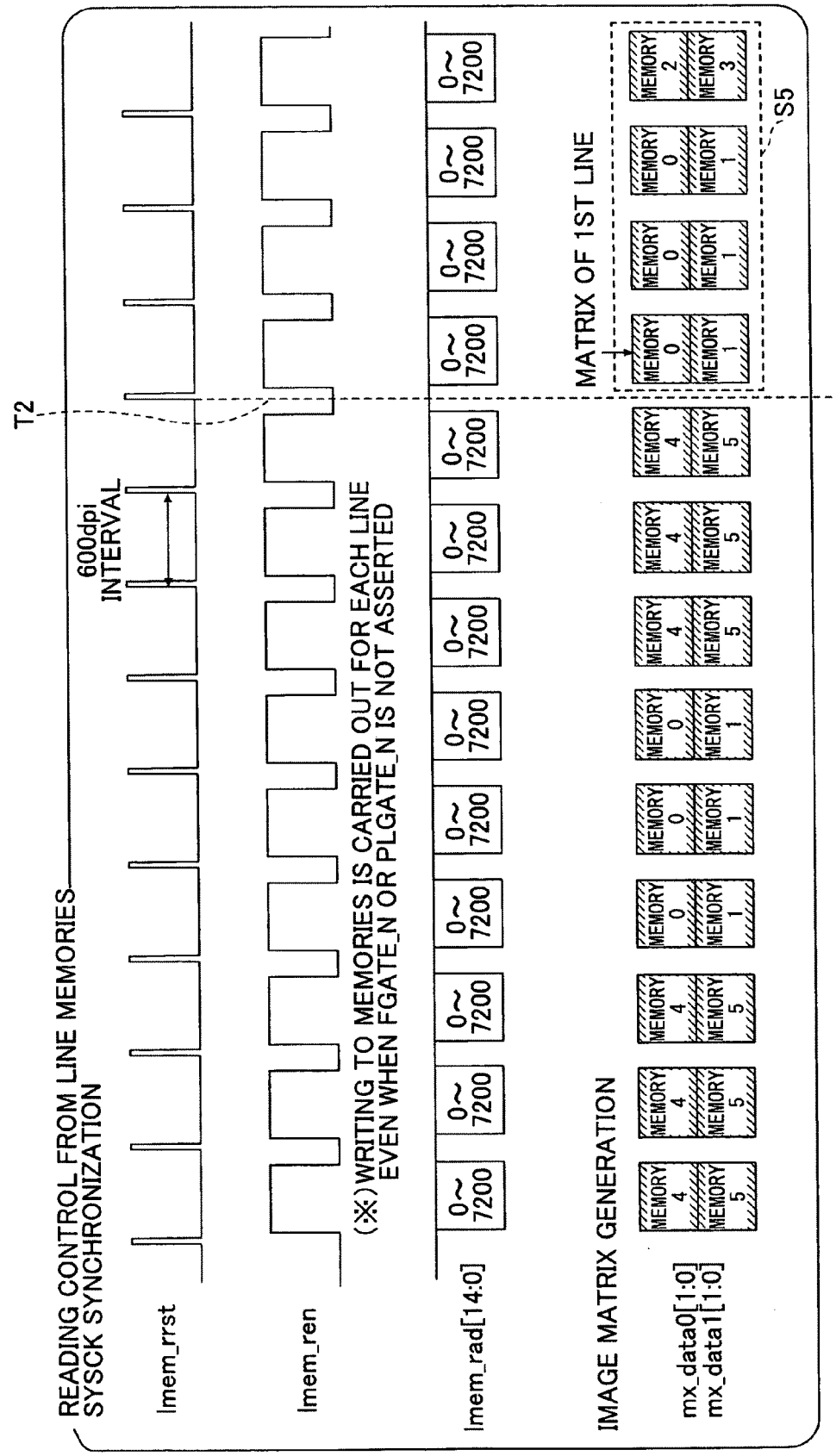
Figure 7D:
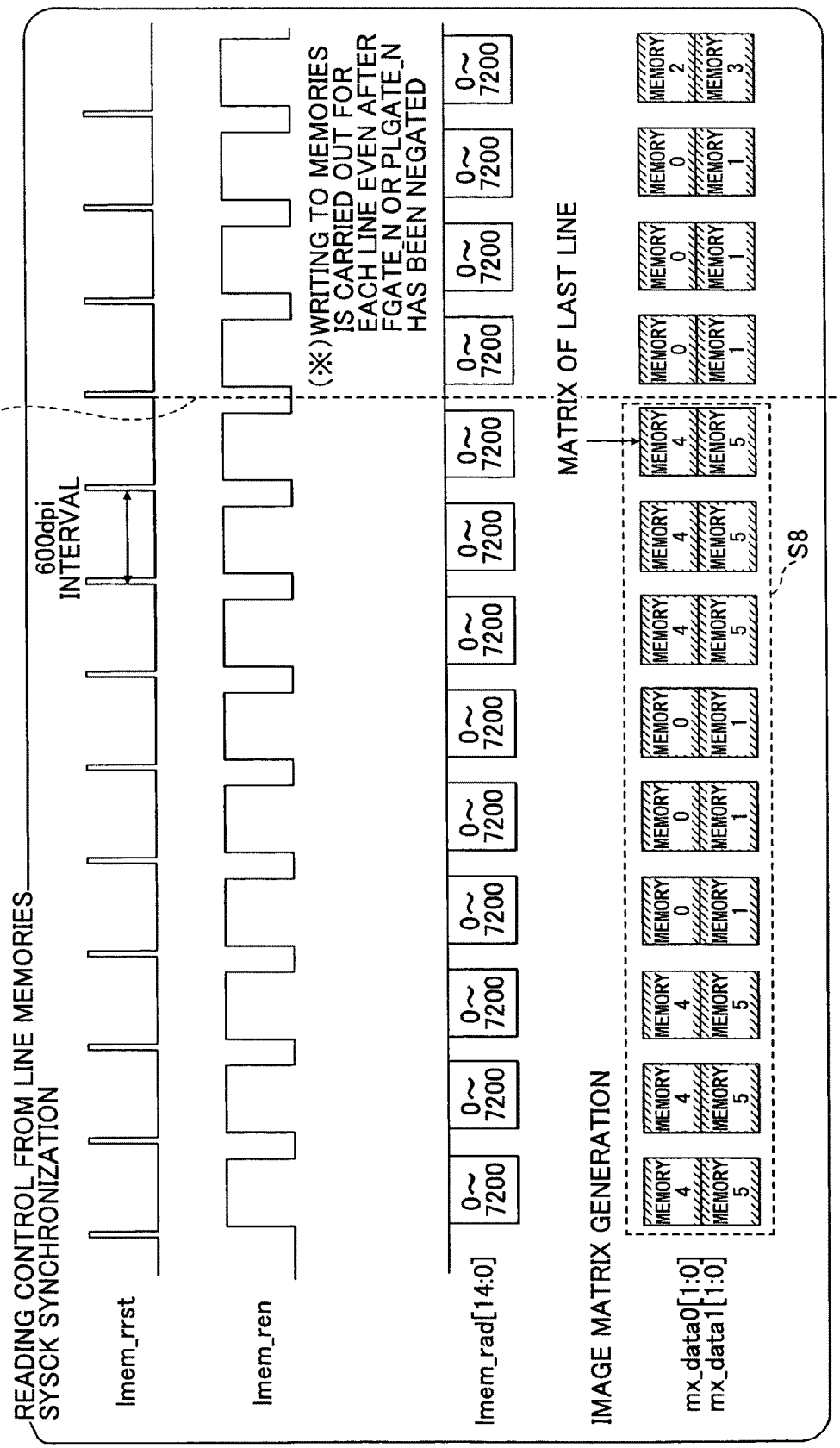
Figure 7E:
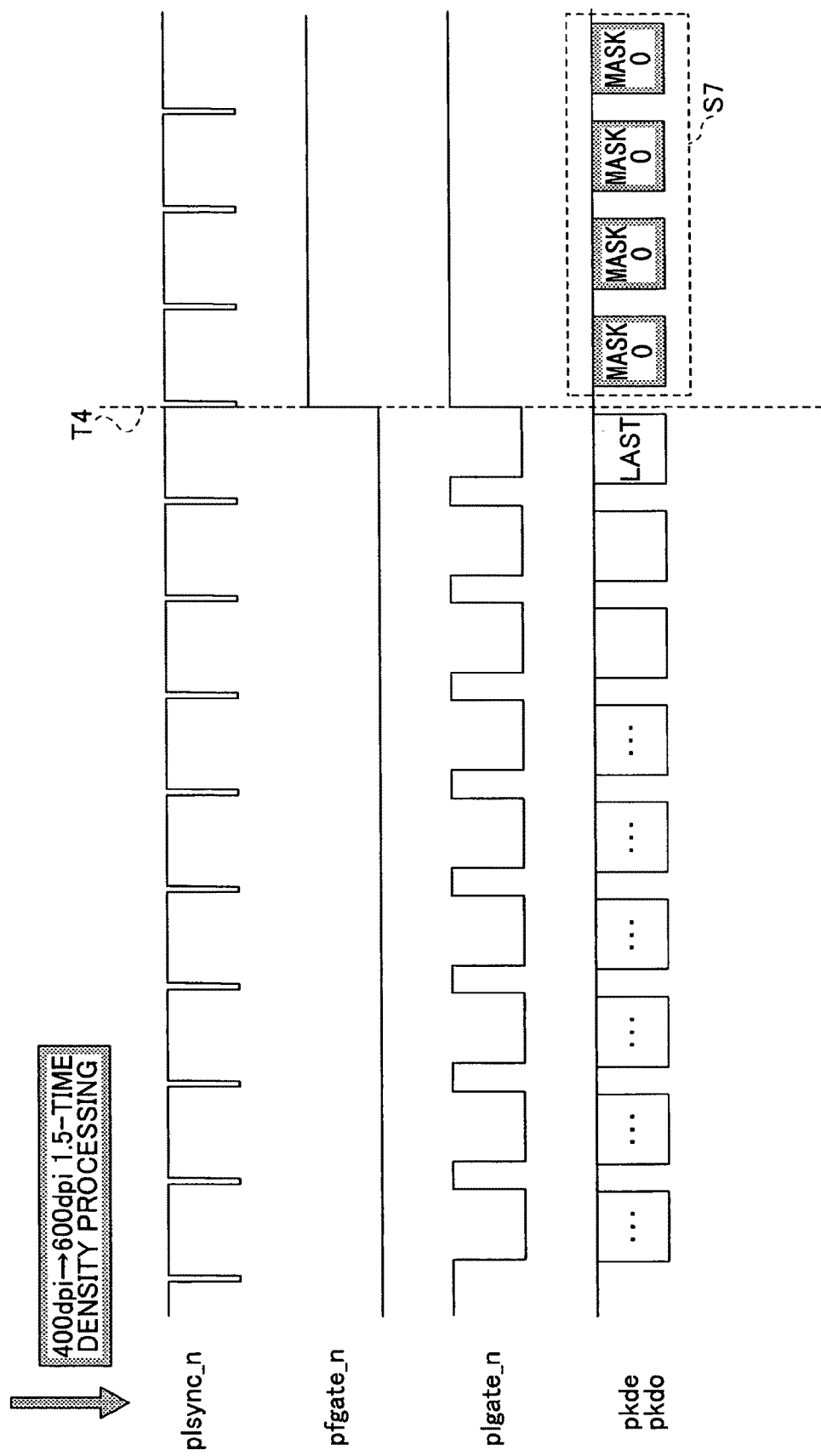

FIG. 6A through 6E depict a start of page processing for an image indicated by image data. As mentioned above, for a case of 1.5-time density transformation, the line synchronization signal LSYNC_N on top of FIG. 6A is thinned. In an example of FIGS. 6A through 6E, a time of page top at which an image zone signal FGATE_N decays is a time at which a first line can be written in the line memory by the line synchronization signal LSYNC_N immediately after the thinning is carried out. Before the image zone signal FGATE_N signal decays, as depicted in a part S1 defined by a broken line in FIG. 6B, masked data is written in the line memories. At a time T1 at which the image zone signal FGATE_N decays, a line memory number lmem_num [2:0] is reset to "0". After that, in sequence, image data of even lines PKDE (i.e., "2", "4", . . . ) and image data of odd lines PKDO (i.e., "1", "3", . . . ) are written in the respective line memories 0 through 5 (i.e., "memory 0", "memory 1", . . . , "memory 5") repetitively. In FIG. 6C, the line memory in which image data is written each time is indicated as being filled with halftone dots. Reading of image data from the line memory is carried out in synchronization of the line synchronization signal plsync_n which is not thinned, and is started at a time T2 delayed by 3 lines with respect to the writing. Further, until the time T2 delayed by 3 lines from the time T1 of the page top at which the image zone signal FGATE_N decays, as depicted by a part S2 defined by a broken line in FIG. 6E, masked data is read. After that, image data of even lines pkde (i.e., "2", "4", . . . ) and image data of odd lines pkdo (i.e., "1", "3", . . . ) are read from the respective line memories. Then, as depicted by a part S5 defined by a broken line in FIG. 6D, with the use of 2 lines of image data read from line memories, a 2 by 2 pixel matrix is generated. At this time, image data of 2 lines written in the line memories 0 and 1 as depicted by a part S3 defined by a broken line in FIG. 6C and image data of 2 lines written in the line memories 2 and 3 as depicted by a part S4 defined by a broken line in FIG. 6C are used. Generating of a 2 by 2 pixel matrix will be described later again with reference to FIGS. 9A, 9B and 9C, and FIGS. 15A, 15B and 15C.

FIGS. 7A, 7B, 7C, 7D and 7E depict a state where page processing for an image indicated by image data is finished. In an example of FIGS. 7A, 7B, 7C, 7D and 7E, a time T3 of page end at which the image zone signal FGATE_N rises is a time at which masked data of "0" can be written in the line memory with the line synchronization signal LSYNC_N immediately after the thinning. Until the image zone signal FGATE_N rises, image data of even lines PKDE and image data of odd lines PKDO are written in the respective line memories 0 through 5 repetitively. After the time T3 at which the image zone signal FGATE_N rises, as depicted by a part S6 defined by a broken line depicted in FIG. 7B, masked data "0" is written in the line memories. Reading from the line memories is carried out, as mentioned above, in synchronization with the synchronization signal psync_n which is not thinned, with a delay of 3 lines from the writing. Then, until a time T4 which is delayed by 3 lines from the time T3 at which the page end, image data of even lines pkde and image data of odd lines pkdo are read from the respective line memories. After that, as depicted by a part S7 defined by a broken line in FIG. 7E, masked data is read. Until the time T4, in the same method as that mentioned above, a 2 by 2 pixel matrix is generated, repetitively.

Next, the image recognition unit 501-3 will be described. The image recognition unit 501-3 determines which type, image data currently processed belongs to. That is, the image recognition unit 501-3 checks a zone extending along the main scan direction of an image indicated by the image data, counts points at which the image changes from white to black or from black to white, and determines whether or not the image is of halftone dots, by determining whether a counted result exceeds a predetermined threshold previously set in a register.

Next, the density transformation processing unit 501-4 will be described. The density transformation processing unit 501-4 includes, as depicted in FIG. 4, a smoothing processing unit 501-4-1, a 1.5-time density processing unit 501-4-2, an image selector 501-4-3 and a format converting unit 501-4-4. The density transformation processing unit 501-4 carries out processing according to a density transformation mode set by the above-mentioned register dense_r[2:0].

First, when the "through mode" is selected, 1-pixel 2-value 1-bit image data is simply transformed into 1-pixel 2-value 2-bit image data, which is then output to the main/sub trimming processing unit 501-5. When any one of the "basic density mode", "two times density mode" and "three times density mode" is selected, corresponding density transformation is carried out on input data, and also, 1-pixel 2-value 1-bit image data is transformed into 1-pixel 2-value 2-bit image data, which is then output to the main/sub trimming processing unit 501-5.

When the "1.5-time density mode" is selected, 1.5-time density transformation is carried out. The 1.5-time density transformation will now be described in detail.

Figure 8:
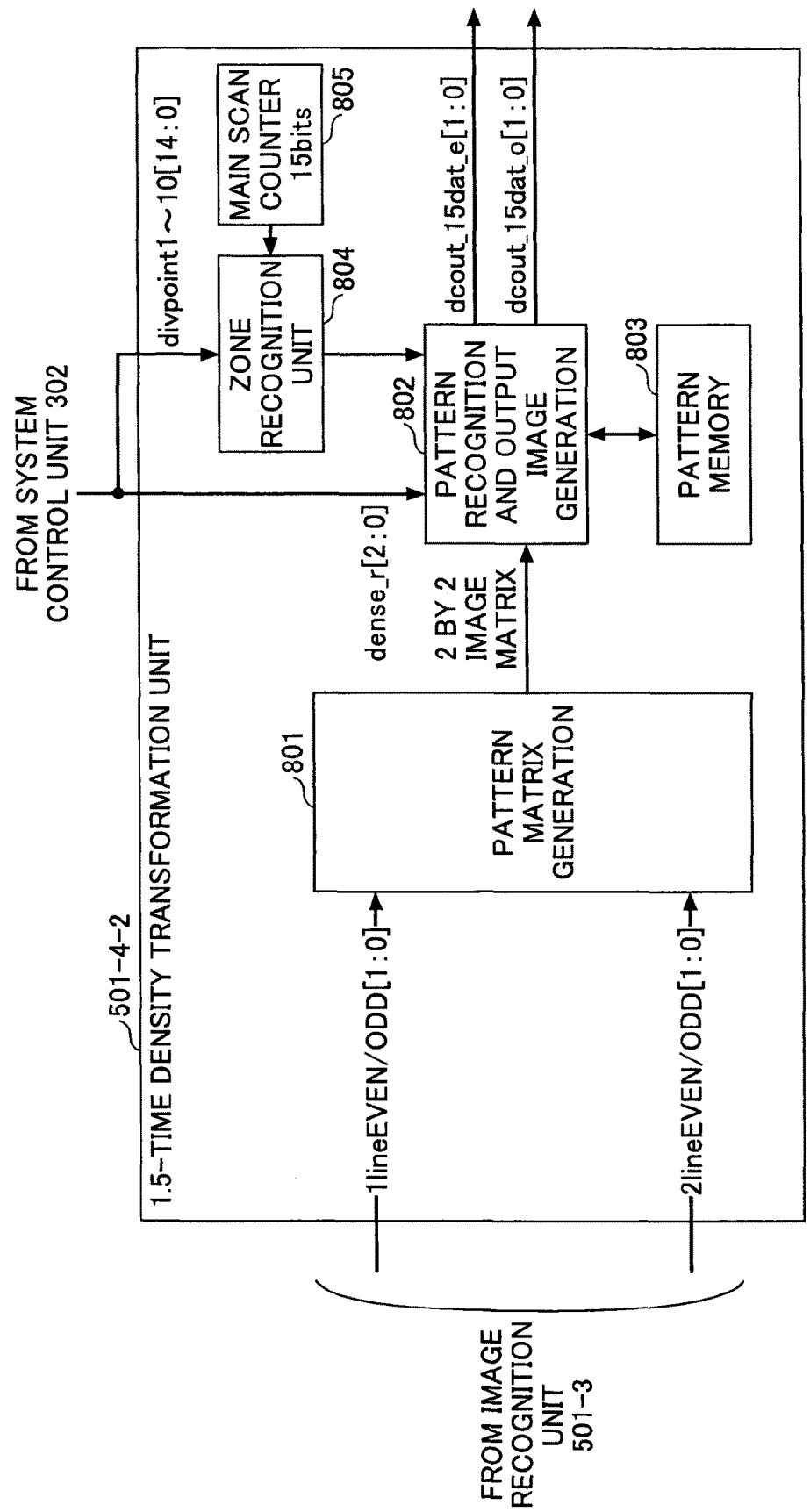
FIG. 8 depicts a block diagram of a 1.5-time density transformation unit which carries out of 1.5-time density transformation.

FIG. 8 depicts a block diagram of the 1.5-time density transformation unit 501-4-2 which carries out the 1.5-time density transformation.

The 1.5-time density transformation unit 501-4-2 has a pattern matrix generation unit 801 which generates a 2 by 2 pixel matrix with the use of 2 lines of image data sent from the image recognition unit 501-3 after being output from the line memories 0-5 of the memory control unit 501-2 depicted in FIG. 4. The 1.5-time density transformation unit 501-4-2 further includes a pattern recognition and output image generation unit 802 which carries out pattern recognition with the use of the 2 by 2 pixel matrix, and generates a corresponding 3 by 6 pixel matrix of image data having undergone 1.5-time density transformation.

Figure 9B:
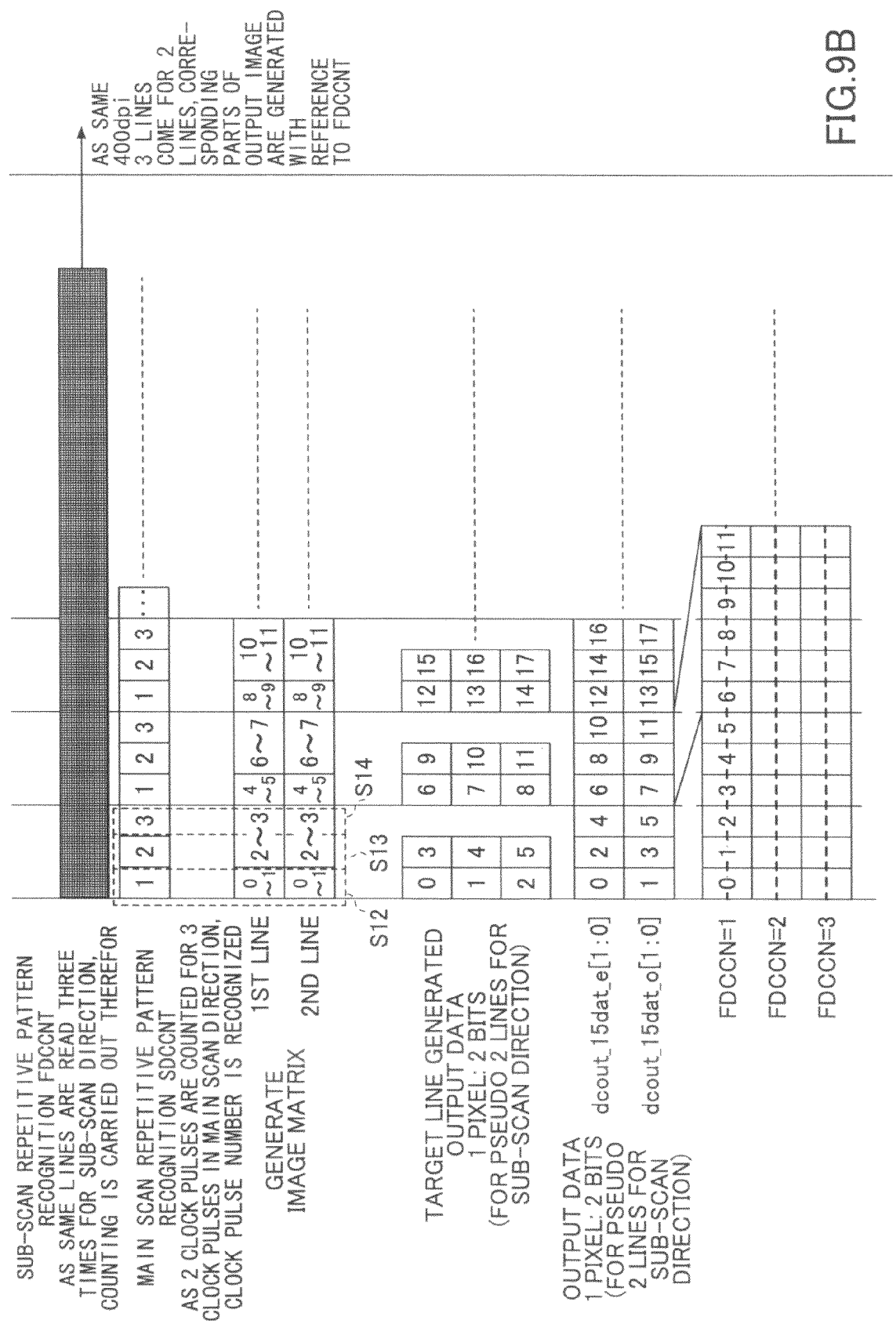

FIGS. 9A, 9B and 9C illustrate a process in which the pattern matrix generation unit 801 latches the given 2 lines of image data and generates the 2 by 2 pixel matrix.

As described above with reference to FIGS. 6A-6E and 7A-7E, the pattern matrix generation unit 801 generates the 2 by 2 pixel matrix with the use of 2 lines of image data. At this time, as depicted in a part S11 defined by a broken line in FIG. 9A, in 1.5-time density transformation, 4 pixels of image data 0, 1, 2 and 3 for each line of successive two lines are sent from the above-mentioned line memories 0-5 with 3 clock pulses of a system clock signal SYSCK. The 2 lines of image data is used, and the 2 by 2 pixel matrix is generated, according to a count value SDCCNT for main scan direction recognition.

That is, as depicted in FIGS. 9A-9C, when the count value SDCCNT is 1, as depicted by a part S12 defined by a broken line in FIG. 9B, 4 pixels of image data 0, 1, 0, 1 on the two lines are latched, and the 2 by 2 pixel matrix is generated therewith. Similarly, when the count value SDCCNT is 2, as depicted by a part S13 defined by a broken line in FIG. 9B, 4 pixels of image data 2, 3, 2, 3 on the two lines are latched, and another 2 by 2 pixel matrix is generated therewith. When the count value SDCCNT is 3, as depicted by a part S14 defined by a broken line in FIG. 9B, the 2 by 2 pixel matrix of the 4 pixels of image data 2, 3, 2, 3 are maintained as it is. Further, in 1.5-time density transformation, the above-mentioned 2 by 2 pixel matrices are transformed into corresponding 3 by 6 pixel matrices, respectively. A count value FDCCNT indicates a position along the sub-scan direction in a 3 by 6 pixel matrix to be generated in 1.5-time density transformation. In 1.5-time density transformation, a position along the sub-scan direction in the 3 by 6 pixel matrix is thus recognized with the use of the count value FDCCNT, and the 2 by 2 pixel matrix generated as mentioned above by the pattern matrix generation unit 801 is compared to reference patterns prepared in the pattern memory 803.

It is noted that given image data is 2-value data or binary data. Therefore, this means that each pixel is either a white pixel or a black pixel. As depicted in FIGS. 12A-12F, the number of possible combinations of white pixels as black pixels of a 2 by 2 pixel matrix can be obtained from $2^4=16$, and thus, the total 16 combinations P1 through P16 are available as depicted in FIG. 12A-12F. Accordingly, the given 2 by 2 pixel matrix of image data corresponds to any one of the respective reference patterns of the 16 combinations. As depicted in FIGS. 12A-12F, for respective ones of the 16 reference patterns P1 through P16, image data P12 through P36 for a 3 by 6 pixel matrix to be generated in 1.5-time density transformation is prepared, and stored in the pattern memory 803. As a result of the above-mentioned comparison, a corresponding reference pattern is obtained, and then, corresponding image data of a 3 by 6 pixel matrix to be generated in 1.5-time density transformation, prepared for the corresponding reference pattern, is then obtained through a relationship depicted in FIGS. 12A-12F. It is noted that, actual values of pixels indicated by rectangles filled with halftone dots depicted in FIGS. 12A-12F are determined according to a position of the above-mentioned 2 by 2 pixel matrix of image data currently processed along the main scan direction. In the embodiment, as mentioned above, according to a position of image data along the main scan direction, image data of a 3 by 6 pixel matrix to be generated in 1.5-time density transformation can be made different. It is noted that image data of a 3 by 6 pixel matrix to be generated in 1.5-time density transformation, depicted in FIGS. 12A-12F, includes a combination of white pixels as black pixels, and is referred to as transformation patterns. The transformation patterns include patterns which are determined according to a position along the main scan direction as mentioned above. As to a procedure of obtaining a 3 by 6 pixel matrix of image data to be generated in 1.5-time density transformation from a 2 by 2 pixel matrix of given image data will be described later with reference to FIG. 15.

As basic processing, the pattern recognition and output image generation unit 802 compares a given 2 by 2 pixel matrix of image data with the above-mentioned 16 reference patterns prepared in the pattern memory 803, and generates a corresponding 3 by 6 pixel matrix of image data with the use of an appropriate one of the transformation patterns prepared in the pattern memory 803.

In the embodiment, in consideration of a position on the main scan direction, which one of the three LPHs 503-1 through 503-3 is used, and whether image date belongs to joint parts between the LPHs 503-1 through 503-3, optimum transformation patterns are prepared. More specifically, as depicted in FIG. 10, zones 1-4 belong to the left LPH 503-1. Thereamong, as depicted in FIG. 10, the zones 1-3 respectively correspond to zones Z1-Z3 as they are which are to be actually considered, while only a part of the above-mentioned zone 4 corresponds to a zone Z4 which is to be actually considered. Zones 5-8 belong to the center LPH 503-2. Thereamong, as depicted in FIG. 10, the zones 6 and 7 respectively correspond to zones Z6 and Z7 as they are which are to be actually considered, while only parts of the above-mentioned zones 5 and 8 correspond to (zone Z5 and Z8, respectively, which are to be actually considered. Zones 9-12 belong to the right LPH 503-3. Thereamong, as depicted in FIG. 10, the zones 10-12 respectively correspond to zones Z10-Z12 as they are which are to be actually considered, while only a part of the above-mentioned zone 9 corresponds to a zone Z9 which is to be actually considered. Further, a left joint part, i.e., a zone 13 or a zone Z13, and a right joint part, i.e., a zone 14 or a zone Z14, are considered. Consequently, total 14 zones, i.e., Z1-Z12, Z13 and Z14 are considered, and respective transformation patterns are prepared therefor separately. It is noted that, as to the joint parts Z13 and Z14, description will be made later with reference to FIG. 11.

The joint parts Z13 and Z14 correspond to predetermined parts (see FIG. 11) respectively included in parts in which respective pixel effective ranges of the three LPHs 503-1 through 503-3 overlap each other along the main scan direction. A zone recognition unit 804 depicted in FIG. 8 determines which zone of the above-mentioned total 14 zones the above-mentioned given 2 by 2 pixel matrix of image data belongs to. At this time, a main scan counter 805 depicted in FIG. 8 provides a count value indicating a position of the image data along the main scan direction, to the zone recognition unit 804. According to a recognition result of the zone recognition unit 804, the pattern recognition and output image generation unit 802 determines a transformation pattern to be actually applied as a 3 by 6 pixel matrix to be generated in 1.5-time density transformation.

FIG. 10 depicts a method for dividing a line of image data for the three LPHs 503-1 through 503-3 and FIG. 11 illustrates states of the joint parts Z13 and Z14 between the three LPHs 503-1 through 503-3.

D1-D11 depicted in FIG. 10 denote respective 11 register values divpoint_r 1-11, indicating positions along the main scan direction. These register values divpoint_r 1-11 are set by the system control unit 302 depicted in FIG. 1. The zone recognition unit 804 determines which one of the above-mentioned total 14 zones Z1-Z14, currently processed image data (or pixels) belongs to, based on the register values divpoint_r. As mentioned above, the zone recognition unit 804 uses the count value given by the main scan counter 805 to carry out the above-mentioned determination.

It is noted that the above-mentioned given 2 by 2 pixel matrix includes two pixels adjacent together along the main scan direction. It is preferable that the above-mentioned total 14 zones Z1-Z14 are set in such a manner that the above-mentioned two pixels adjacent together along the main scan direction do not respectively belong to mutually adjacent two zones of the 14 zones Z1-Z14. In other words, it is preferable that the above-mentioned total 14 zones Z1-Z14 are set in such a manner that the above-mentioned two pixels adjacent together along the main scan direction do not occur across mutually adjacent two zones of the 14 zones Z1-Z14. In the embodiment, as depicted in FIG. 11, 2 pixels included in the above-mentioned 2 by 2 pixel matrix of image data mutually adjacent in the main scan direction may respectively occur across a boundary between the left LPH 503-1 and the left joint part Z13, or between the two mutually adjacent zones Z4 and Z13. Similarly, 2 pixels included in the above-mentioned 2 by 2 pixel matrix of image data mutually adjacent in the main scan direction may respectively occur across a boundary between the left joint part Z13 and the center LPH 503-2, or between the two mutually adjacent zones Z13 and Z5. Similarly, 2 pixels included in the above-mentioned 2 by 2 pixel matrix of image data mutually adjacent in the main scan direction may respectively occur across a boundary between the center LPH 503-2 and the right joint part Z14, or between the two mutually adjacent zones Z8 and Z14. Similarly, 2 pixels included in the above-mentioned 2 by 2 pixel matrix of image data mutually adjacent in the main scan direction may respectively occur across a boundary between the right joint part Z14 and the right LPH 503-3, or between the two mutually adjacent zones Z14 and Z9.

That is, in FIG. 11, in a case of given 2 by 2 pixel matrices E1, E2, E3, E6, E7 and E8, the matrix E1 occurs across the boundary between the zones Z4 and Z13, the matrix E3 occurs across the boundary between the zones Z13 and Z5, the matrix E6 occurs across the boundary between the zones Z8 and Z14, and the matrix E8 occurs across the boundary between the zones Z14 and Z9. On the other hand, in a case of given 2 by 2 pixel matrices E4, E5, E9 and E10, the matrix E4 completely belongs to the zone Z13, and thus, does not occur across between the zones Z4 and Z13. Similarly, the matrix E5 completely belongs to the zone Z13, and thus, does not occur across between the zones Z13 and Z5. Similarly, the matrix E9 completely belongs to the zone Z14, and thus, does not occur across between the zones Z8 and Z14. Similarly, the matrix E10 completely belongs to the zone Z9, and thus, does not occur across between the zones Z14 and Z9.

It is noted that, as depicted in FIG. 11, 4 pixels are determined as belonging to each of the above-mentioned joint parts Z13 and Z14 in respective parts in which the LPHs 503-1 and 503-2 overlap one another and the LPHs 503-2 and 503-3 overlap one another. A starting point and an ending point of each of the joint parts Z13 and Z14 are detected based on the above-mentioned register values divpoint_r D4 and D8 depicted in FIG. 10. It is noted that, there may be a first case where a given 2 by 2 pixel matrix of image data occurs across between the LPH and the joint part as mentioned above (i.e., in the case of given matrices E1, E3, E6 and E8 depicted in FIG. 11), and a second case where a given 2 by 2 pixel matrix of image data does not occur across between the LPH and the joint part as mentioned above (i.e., in the case of given matrices E4, E5, E9 and E10 depicted in FIG. 11). Therefore, the above-mentioned transformation patterns are prepared separately for these first case and second case, respectively. More specifically, in the embodiment, respective transformation patterns are prepared separately for respective cases where a given 2 by 2 pixel matrix of image data corresponds to any matrix of the above-mentioned 10 matrices E1-E10.

The above-mentioned transformation patterns respectively prepared for the above-mentioned total 14 zones Z1-Z14 are stored in the above-mentioned pattern memory 803 in such a manner that the system control unit 302 can designate an appropriate transformation pattern with the use of divided zone register values Opat1-1[7:0] through Opat12-12[3:0] and joint part register values Otpat1-1[7:0] through Otpat10-12[3:0].

FIGS. 12A-12F depict one example of the correspondence relationship between the reference patterns for a given 2 by 2 pixel matrix and corresponding transformation patterns for a 3 by 6 pixel matrix of image data as image data generated through 1.5-time density transformation. It is noted that, the example depicted in FIGS. 12A-12F is a specific example for the divided zone 1, i.e., the zone Z1. Also as to the other divided zones Z1-Z12 and the joint parts Z13 and Z14, similar relationships between the reference patterns for a given 2 by 2 pixel matrix and corresponding transformation patterns for a 3 by 6 pixel matrix of image data as image data generated trough 1.5-time density transformation, may be provided. In the example of FIGS. 12A-12F, total 16 reference patterns P1-P16 of 2 by 2 pixel matrices are provided as mentioned above, and total 16 transformation patterns P21-P36 3 by 6 pixel matrices are provided corresponding to the 16 reference patterns P1-P16, respectively. In FIGS. 12A-12F, white rectangles or squares denote white pixels, and hatched rectangles or squares denote black pixels. Further, rectangles filled with halftone dots such as those denoted in FIGS. 12A-12F are actually determined as to be white pixels or black pixels according to which of the above-mentioned total 14 zones Z1-Z14, image data belongs to. Further, as to the joint parts Z13 and Z14, rectangles filled with halftone dots such as those denoted in FIGS. 12A-12F are actually determined according to which of the above-mentioned total ten matrices E1-E10, image data corresponds to.

In the embodiment, as mentioned above, particular transformation patterns are applied for respective ones of the zones, and thus, possible image quality degradation which may otherwise occur can be avoided or reduced.

Figure 12A:
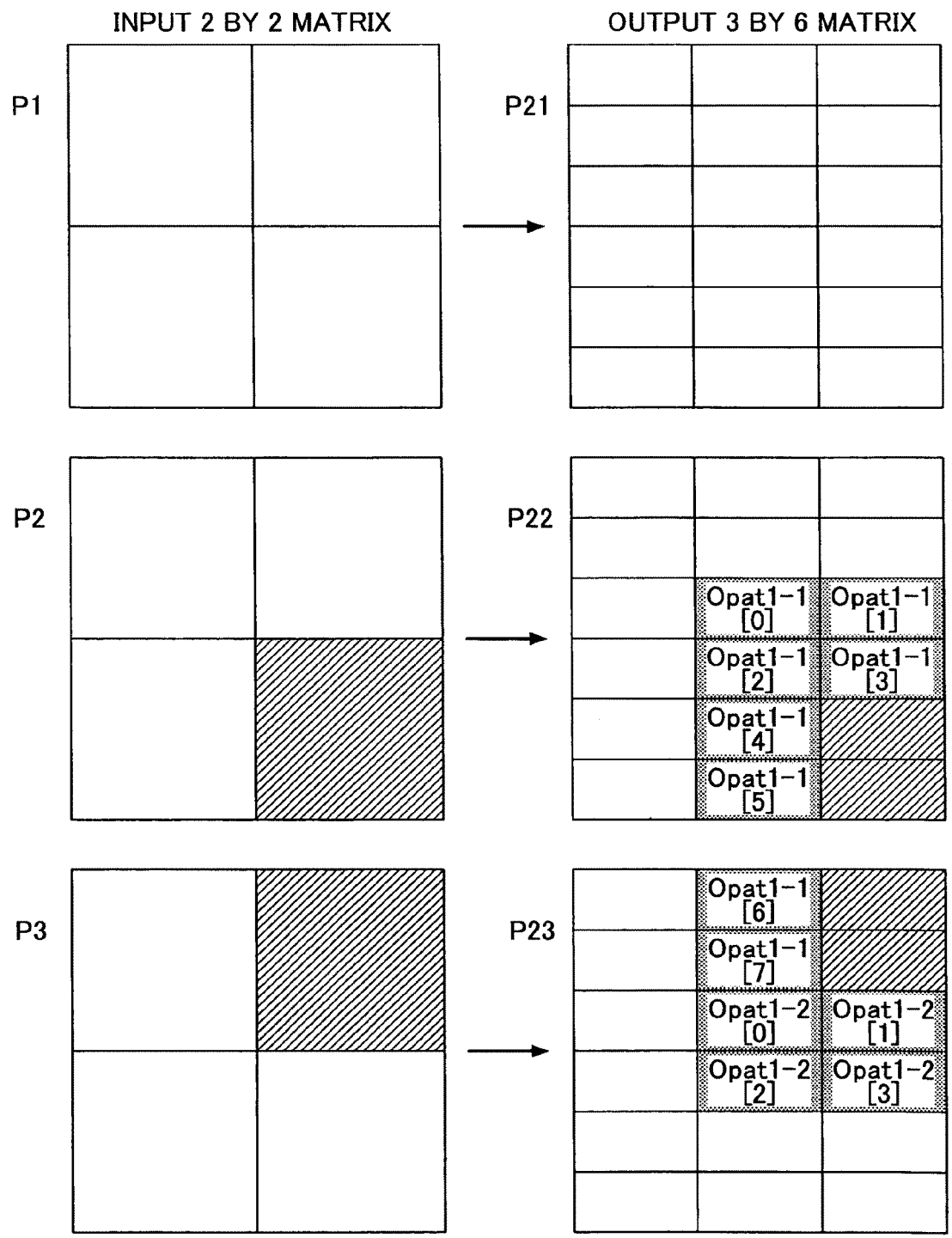
FIGS. 12A, 12B, 12C, 12D, 12E and 12F depict relationship between reference matrices for input image data and transformation patterns for output image data, stored in registers.
Figure 12B:
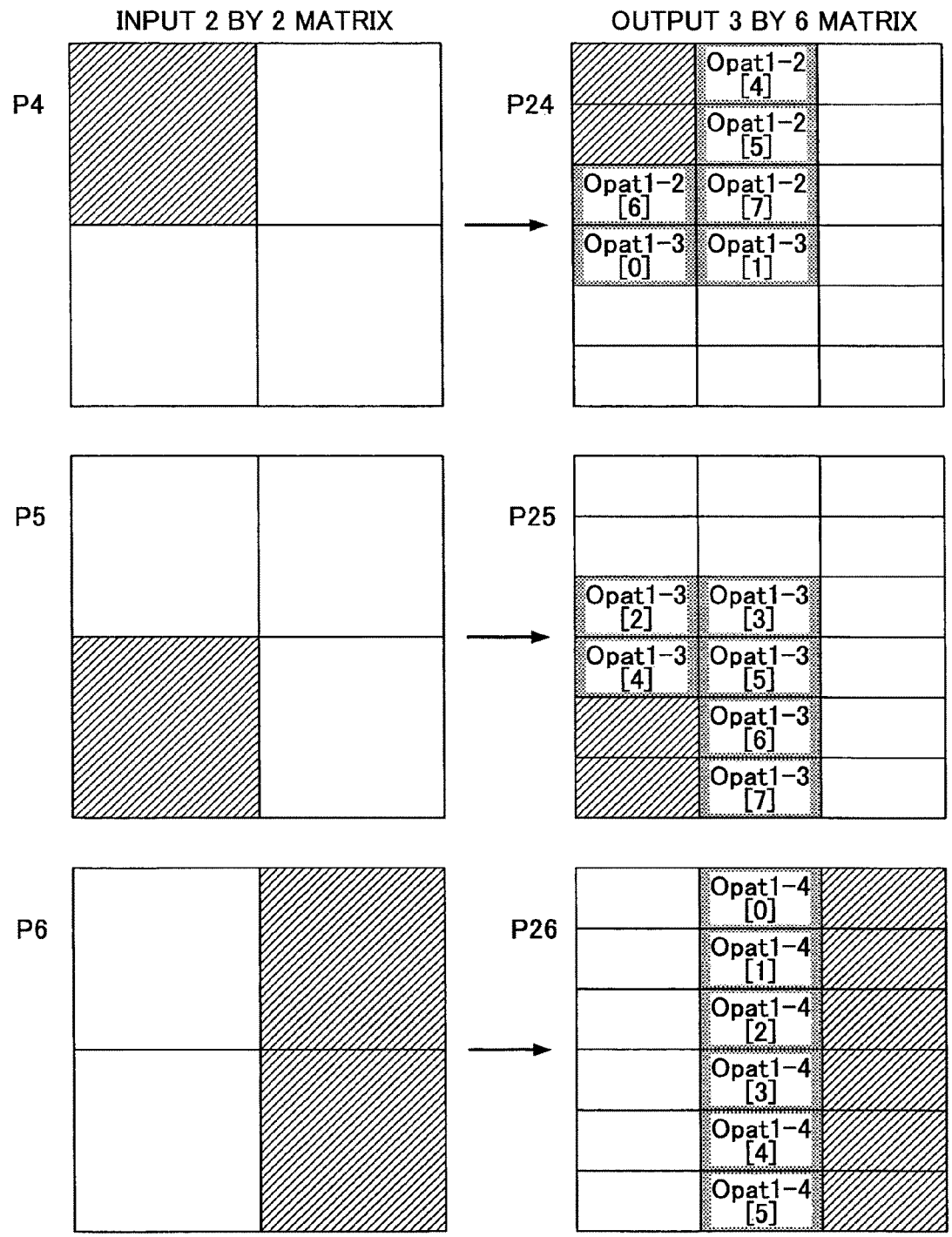
Figure 12C:
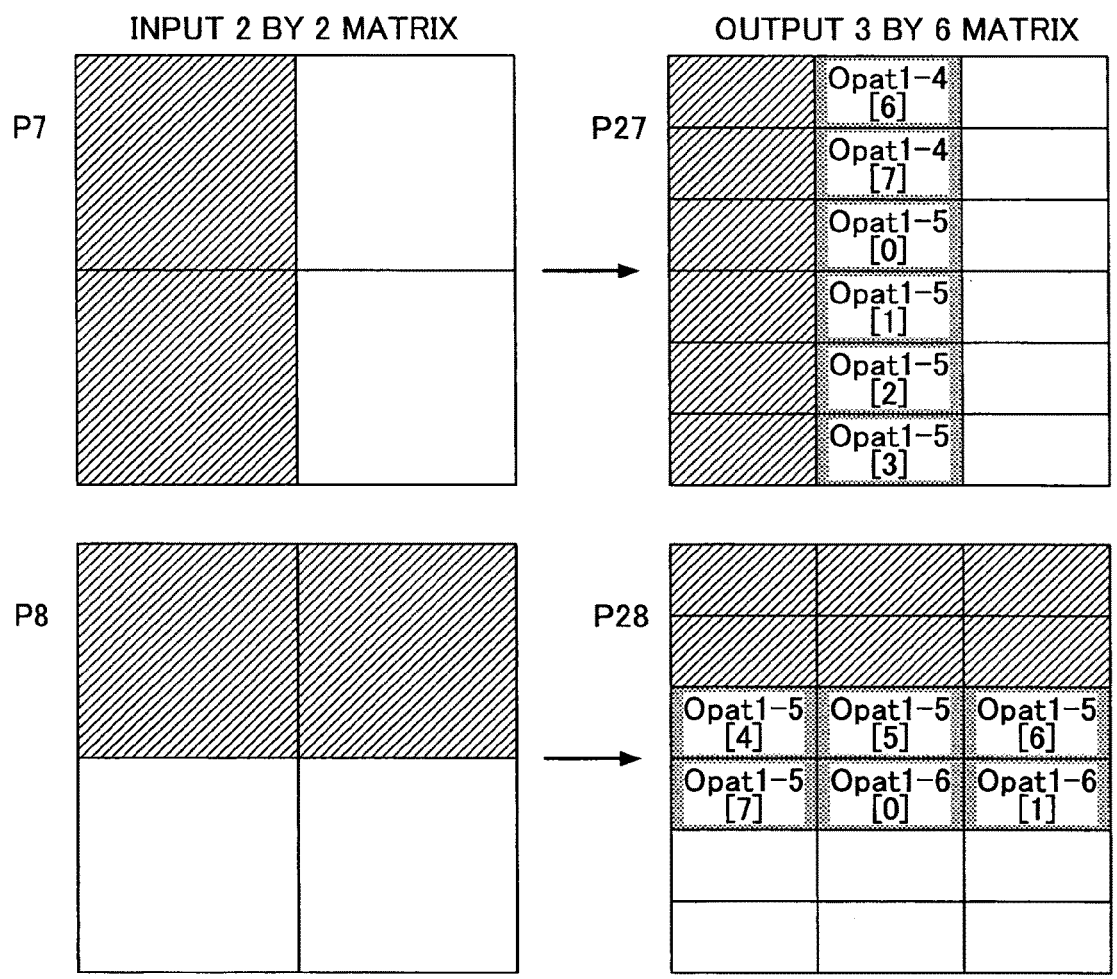
Figure 12D:
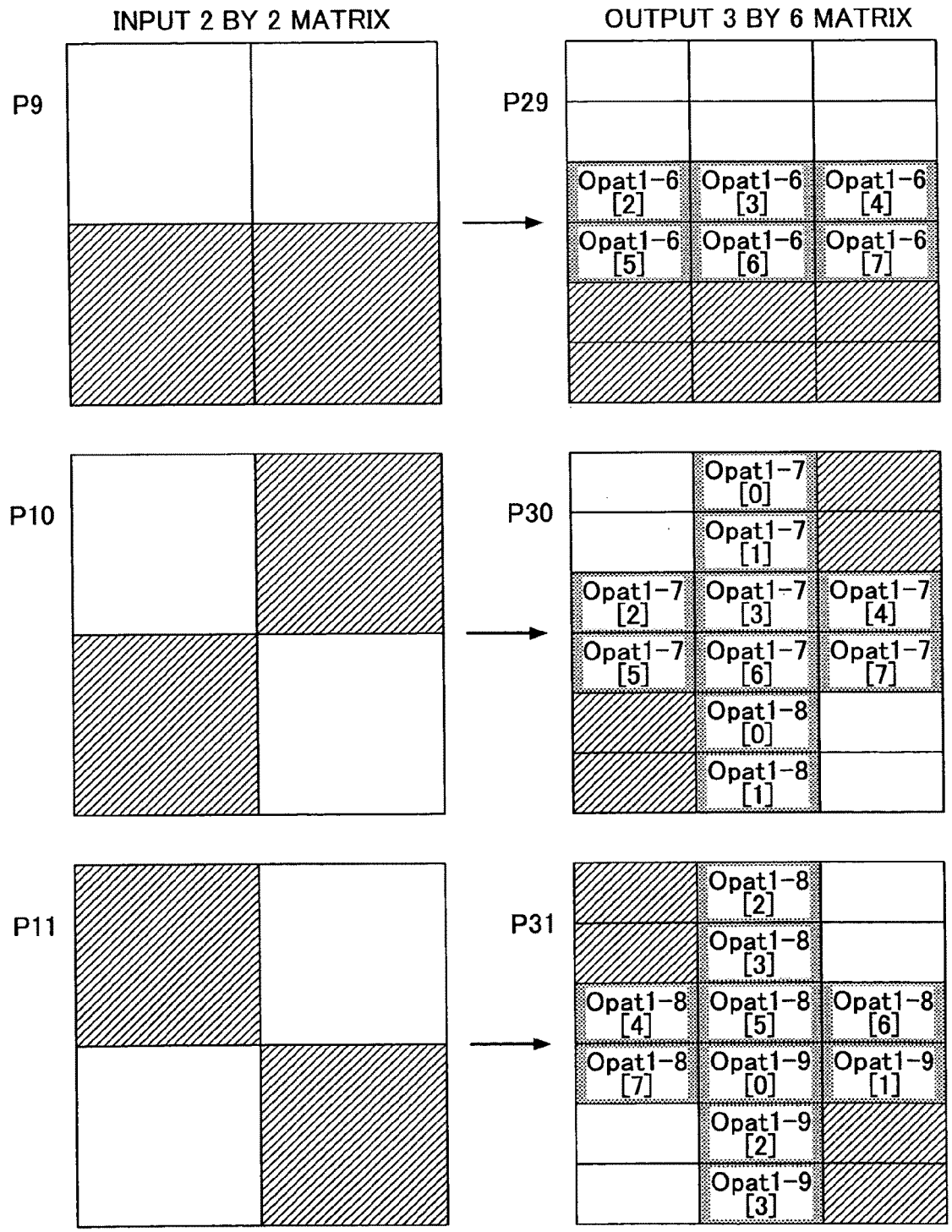
Figure 12E:
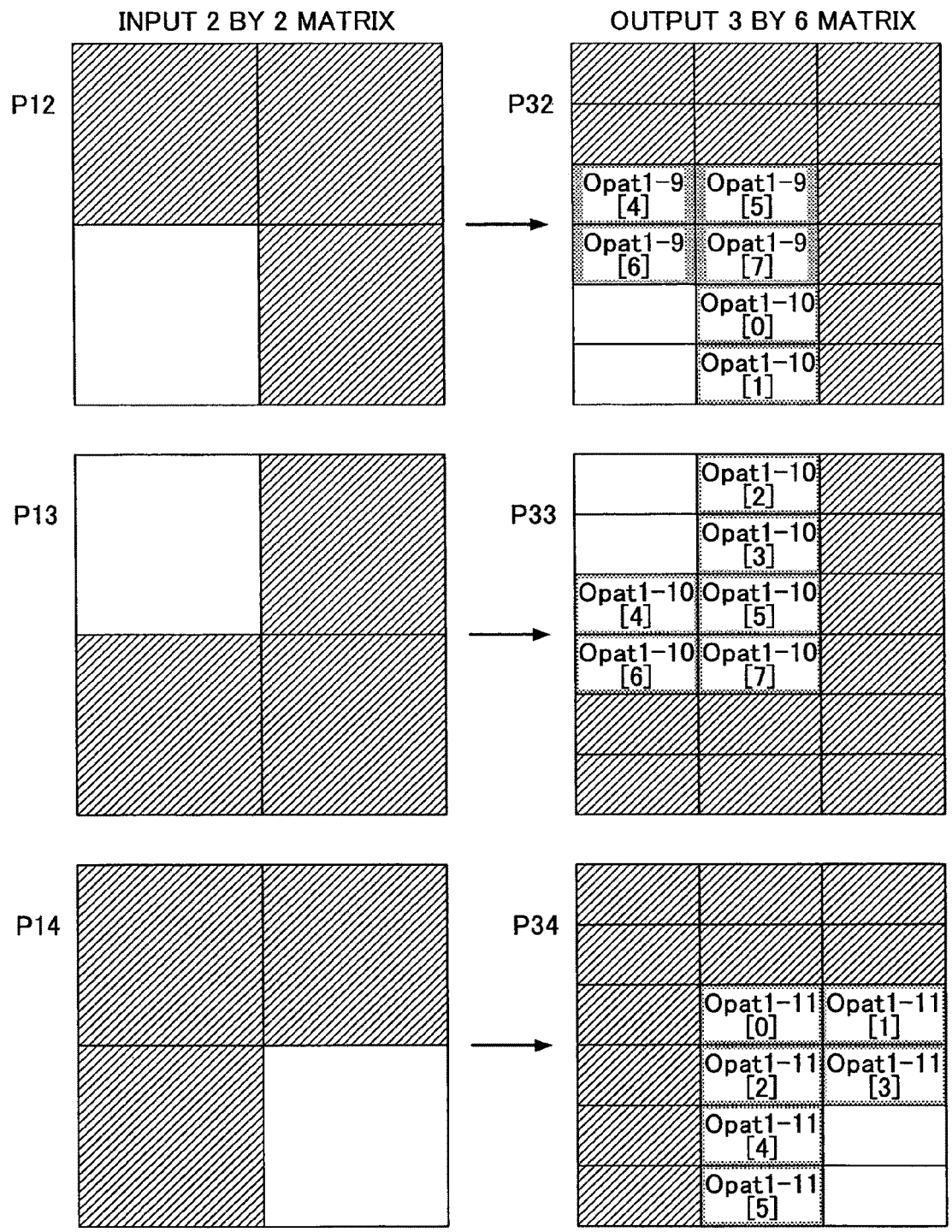
Figure 12F:
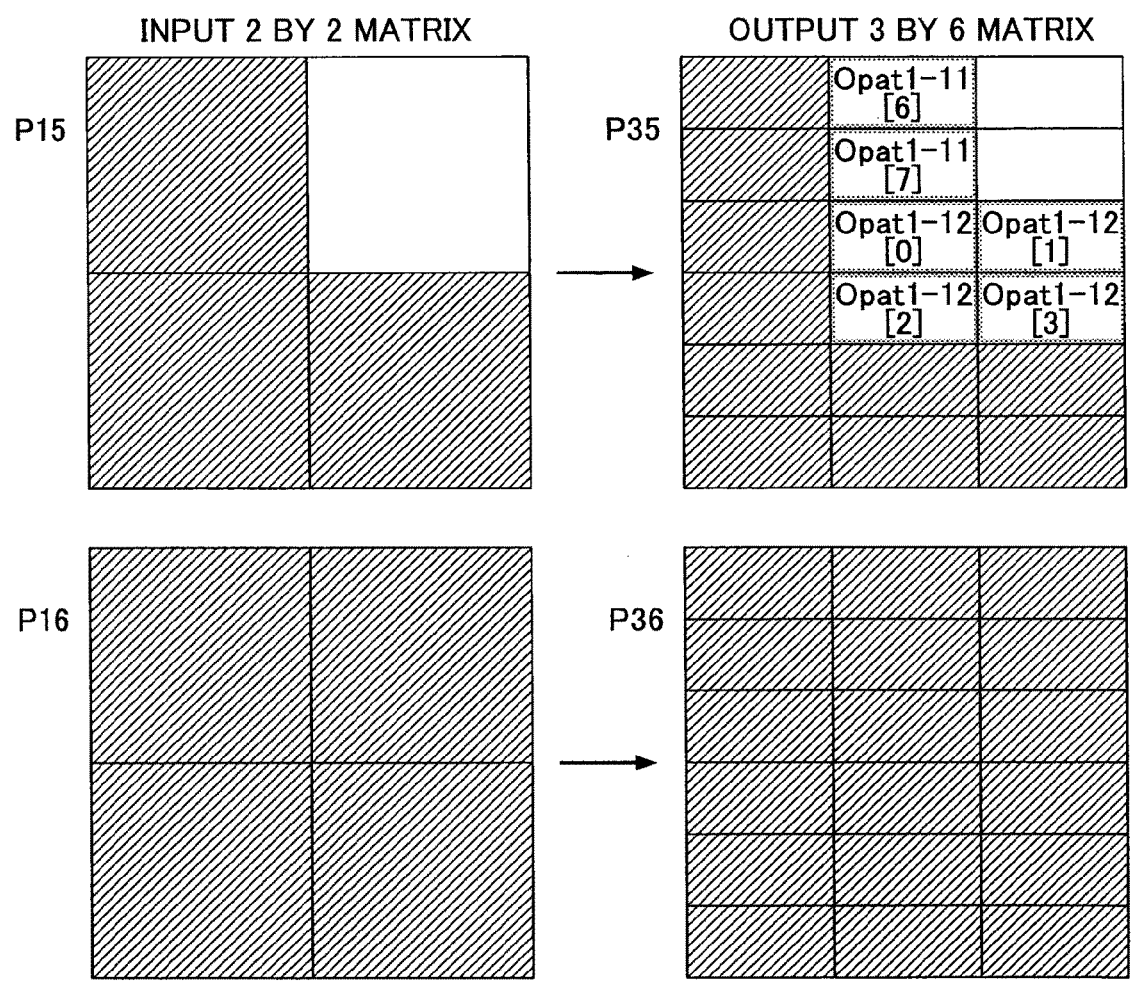

FIGS. 13 and 14 denote register maps setting the above-mentioned transformation patterns for density transformation. FIG. 13 denotes 12 sets of data corresponding to the 12 divided zones Z1-Z12 of the above-mentioned 14 zones Z1-Z14, respectively. That is, a set of data for the zone Z1 includes data Opat1-1[7:0] through Opat1-12[3:0] in the first map depicted in FIG. 13. Also for the zones Z2 through Z11, corresponding 10 sets of data are provided in the same way (not depicted). A set of data for the zone Z12 includes data Opat12-1[7:0] through Opat12-12[3:0] in the last map depicted in FIG. 13. Thereamong, for example, FIGS. 12A-12F corresponds to the set of data for the divided zone Z1, as mentioned above. In FIG. 12A, for example, to Opat1-1[0] of the transformation pattern P22, a first bit (i.e., bit "0") of Opat1-1[7:0] is applied. In the same way, to pixels filled with halftone dots in the transformation patterns P22-P35 of FIGS. 12A-12F, corresponding data of FIG. 13 is applied. Then, to the pixel Opat1-12[3] of the transformation pattern P35 of FIG. 12F, the last bit (i.e., bit "3") of Opat1-12[3:0] is applied.

In the same way, FIG. 14 depicts 10 sets of data, respectively corresponding to the 10 matrices E1-E10 depicted in FIG. 11 for the joint parts Z13 and Z14. That is, Otpat1-1[7:0] through Otpat1-12[3:0] included in the first map of FIG. 14 corresponds to the above-mentioned matrix E1. As to the matrices E2-E9, the same way is applied (not depicted). Then, Otpat10-1[7:0] through Otpat10-12[3:0] included in the last map of FIG. 14 corresponds to the matrix E10.

Returning to FIG. 4, the main/sub trimming processing unit 501-5 carries out trimming processing. That is, masking processing is carried out in both the main scan direction and the sub-scan direction. Masking amounts in the masking processing are determined according to register values. It is noted that the masking processing is such that printing is avoided for margin parts of paper located at the top, bottom, left end and right end, by setting "0" in corresponding image data.

In the embodiment, the three LPHs 503-1 through 503-3 are used for writing image data for an A-0 size width. However, in another embodiment, the number of LPHs may be increased to more than the three. In such a case, the number of zones to be considered along the main scan direction may increase, and accordingly, additional register values may be provided. On the other hand, in further another embodiment, only a single LPH is used for the A-0 size width.

Figure 15A:
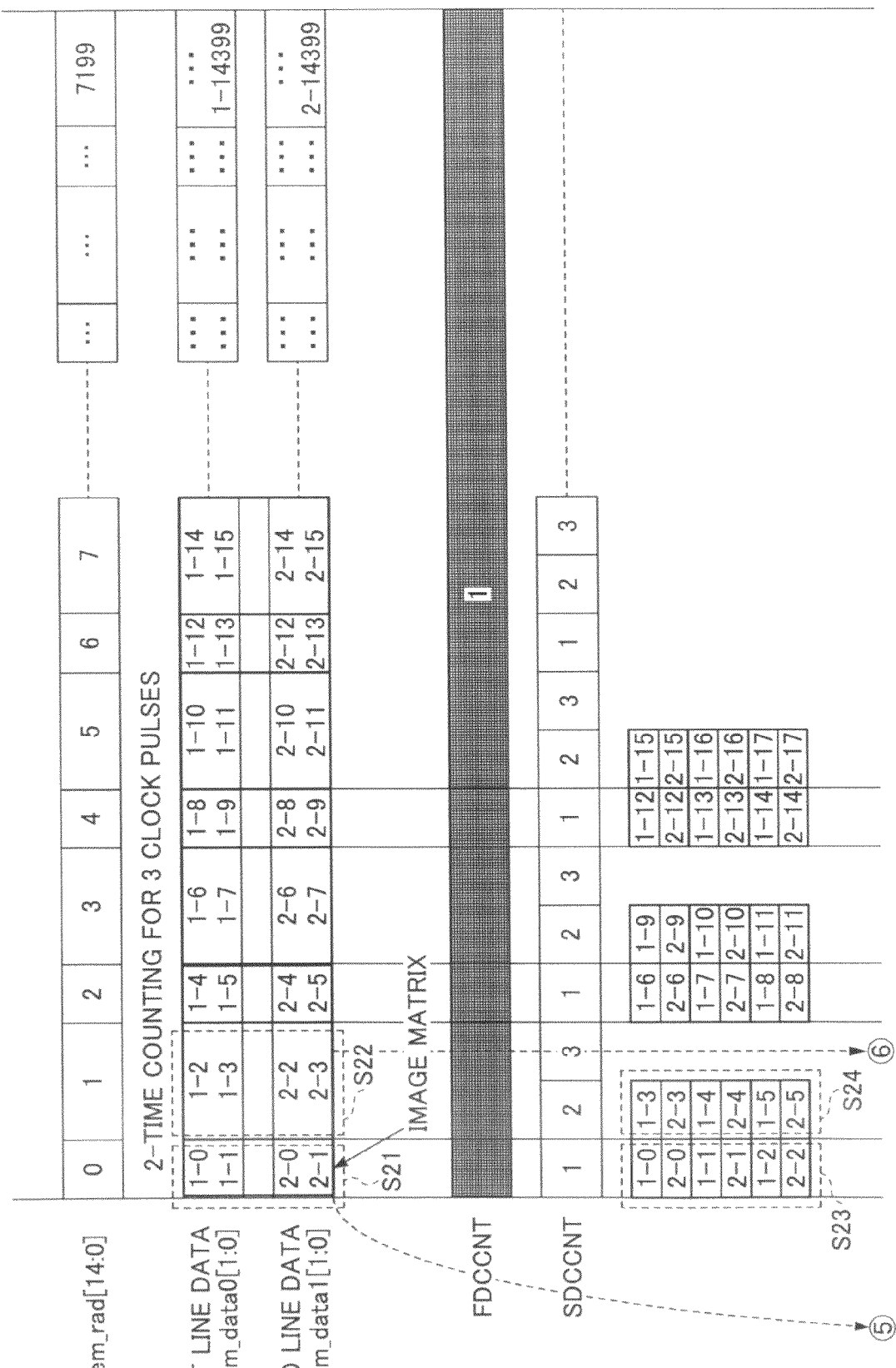
Figure 15C:
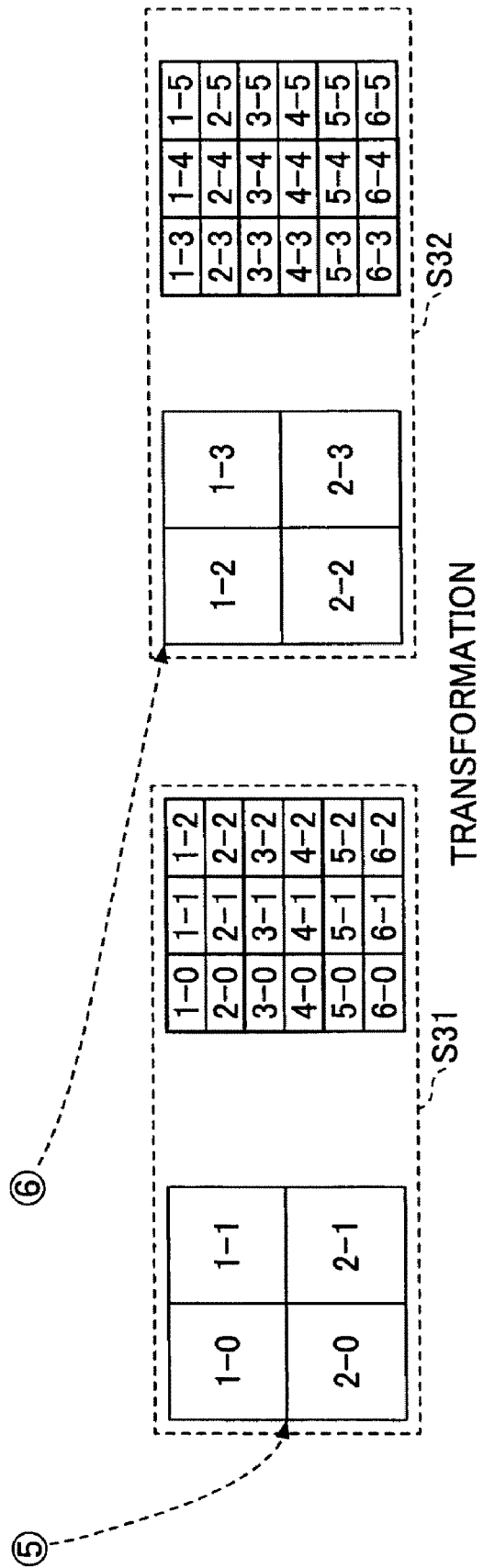

Next, with reference to FIGS. 15A-15C, a procedure of 1.5-time density transformation will be described in more detail. In the procedure of 1.5-time density transformation, as mentioned above with reference to FIGS. 9A-9C, a given 2 by 2 pixel matrix of image data is transformed into a 3 by 6 pixel matrix of image data. In FIGS. 15A-15C, pixels on a first line 0, 1, 2, . . . in FIGS. 9A-9C are referred to as 1-0, 1-1, 1-2, . . . . In the same way, pixels on a second line 0, 1, 2, . . . in FIGS. 9A-9C are referred to as 2-0, 2-1, 2-2, . . . . As mentioned above with reference to FIGS. 9A-9C, a 2 by 2 pixel matrix of given image data is generated, as depicted by a part S31 defined by a broken line in FIG. 15C, from 2 pixels 1-0 and 1-1 on the first line read from the line memory 0 and 2 pixels 2-0 and 2-1 on the second line read from the line memory 1 (also see FIGS. 6A-6E and 7A-7E), as depicted by a part S21 defined by a broken line in FIG. 15A. In the same way, another 2 by 2 pixel matrix of image data is generated, as depicted by a part S32 defined by a broken line in FIG. 15C, from 2 pixels 1-0 and 1-1 on the first line read from the line memory 0 and 2 pixels 2-0 and 2-1 on the second line read from the line memory 1, as depicted by a part S22 defined by a broken line in FIG. 15A. Then, each of these 2 by 2 pixel matrices of given image data is compared with the 16 reference patterns depicted in FIGS. 12A-12F, and it is determined which reference pattern corresponds to each of the 2 by 2 pixel matrices of given image data. Then, according to transformation patterns prepared for corresponding reference patterns, the 2 by 2 pixel matrices of given image data are transformed into corresponding 3 by 6 pixel matrices of image data to be output. Thus, as depicted in FIG. 15C, the above-mentioned part S31, the 2 by 2 pixel matrix of image data on the left side is transformed into the 3 by 6 pixel matrix of image data on the right side. In the same way, as depicted in FIG. 15C, the above-mentioned part S32, the 2 by 2 pixel matrix of image data on the left side is transformed into the 3 by 6 pixel matrix of image data on the right side.

It is noted that, each line of image data is read from the line memory three times for generating the 3 by 6 pixel matrices of image data to be output. For example, the above-mentioned 2 pixels 1-0, 1-1 on the first line and 2 pixels 2-0, 2-1 on the second line are read from the respective line memories 0 and 1 three times. With the use of the 2 by 2 pixel matrix of image data generated from these 2 pixels 1-0, 1-1 and 2 pixels 2-0, 2-1 on the first and second lines read from the respective line memories 0 and 1 first time, image data 1-0, 2-0, 1-1, 2-1, 1-2, 2-2, which corresponds to first and second lines of the objective 3 by 6 pixel matrix of image data (see FIG. 15C, the part S31), are generated, as depicted in part S23 defined by a broken line of FIG. 15A. In the same way, with the use of the 2 by 2 pixel matrix of image data generated from the 2 pixels 1-0, 1-1 and 2 pixels 2-0, 2-1 read from the respective line memories 0 and 1 second time, image data 3-0, 4-0, 3-1, 4-1, 3-2, 4-2, which corresponds to third and fourth lines of the objective 3 by 6 pixel matrix of image data, are generated, as depicted in part S25 defined by a broken line of FIG. 15B. In the same way, with the use of the 2 by 2 pixel matrix of image data generated from these 2 pixels 1-0, 1-1 and 2 pixels 2-0, 2-1 read from the respective line memories 0 and 1 third time, image data 5-0, 6-0, 5-1, 6-1, 5-2, 6-2, which corresponds to fifth and sixth lines of the objective 3 by 6 pixel matrix of image data, are generated, as depicted in part S27 defined by a broken line of FIG. 15B.

In the same way, with the use of the 2 by 2 pixel matrix of image data generated from these 2 pixels 1-2, 1-3 and 2 pixels 2-2, 2-3 on the first and second lines read from the respective line memories 0 and 1 first time through third time, image data 1-3, 2-3, 1-4, 2-4, 1-5, 2-5, which corresponds to first and second lines of the next objective 3 by 6 pixel matrix of image data (see FIG. 15C, the part S32), image data 3-3, 4-3, 3-4, 4-4, 3-5, 4-5, which corresponds to third and fourth lines of the objective 3 by 6 pixel matrix of image data, and image data 5-3, 6-3, 5-4, 6-4, 5-5, 6-5, which corresponds to fifth and sixth lines of the objective 3 by 6 pixel matrix of image data, are generated, as depicted in parts S24, S26 and S28 defined by broken lines of FIGS. 15A and 15B.

Figure 16A:
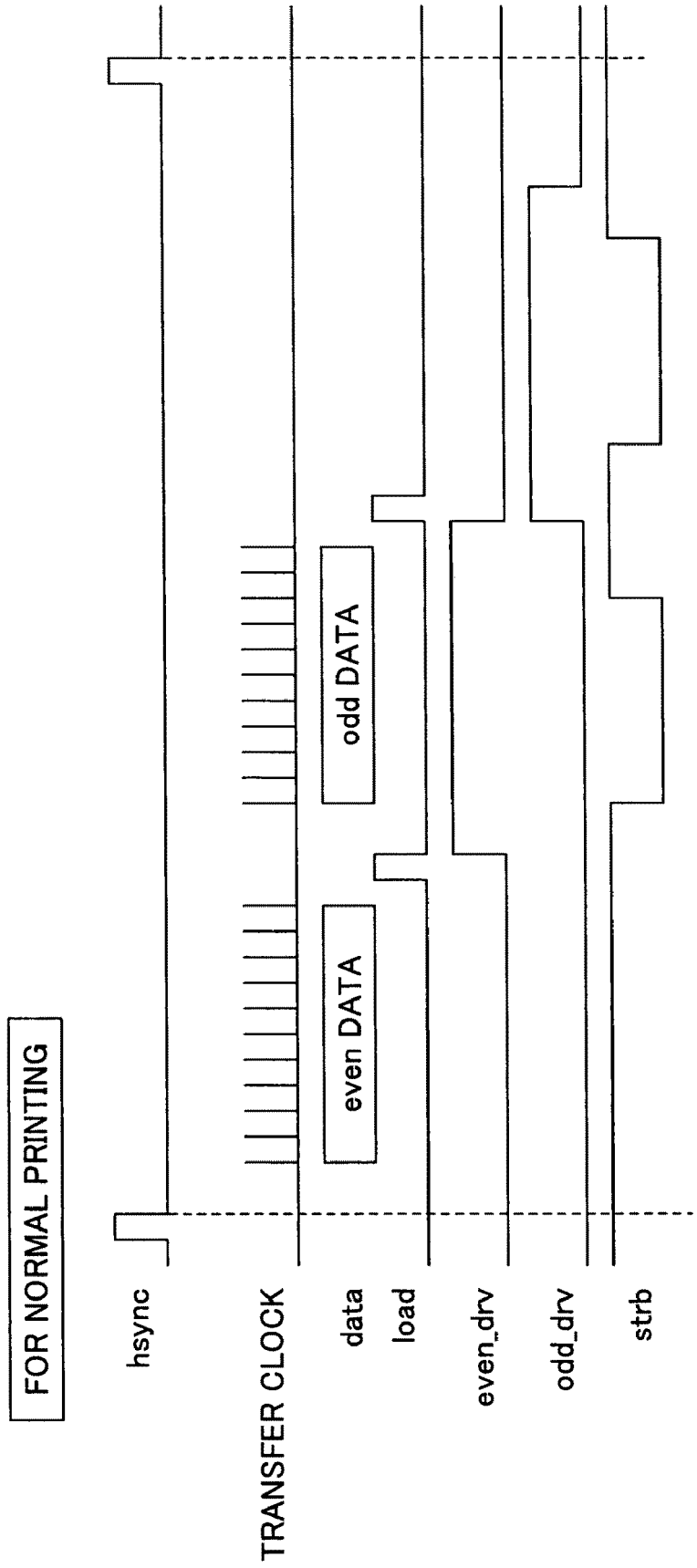

FIGS. 16A and 16B illustrate the above-mentioned pseudo 1200 dpi printing way. The pseudo 1200 dpi printing way will now be described. In the above-mentioned 1.5-time density transformation, a 2 by 2 matrix of image data is transformed into a 3 by 6 pixel matrix of image data, and then, an image is written on the photosensitive drum 25 by the corresponding LPH based on the 3 by 6 pixel matrix image data. At this time, during a writing period for one line of image data corresponding to a 600 dpi printing way, two lines of image data is written in the pseudo 1200 dpi printing way. In FIG. 16A for a normal printing way for 600 dpi, during a period in which line synchronization signal hsync has a low level, LEDs of even-th pixels of the LPHs are driven, and the even-th pixels "even data" are thus written on the photosensitive body 25. In the same way, LEDs of odd-th pixels of the LPHs are driven, and the odd-th pixels "odd data" are thus written on the photosensitive body 25. More specifically, the even data transferred to the LPHs is fixed in the LPHs in response to a "load" signal, the corresponding LEDs in the LPHs are driven in response to an "even_drv" signal being asserted during a period in which a "strb" signal has a low level. During the above-mentioned LEDs being then driven, the odd data transferred to the LPHs is fixed in the LPHs in response to a "load" signal, the corresponding LEDs in the LPHs are driven in response to an "odd_drv" signal being asserted during a period in which a "strb" signal has a low level.

On the other hand, in the pseudo 1200 dpi printing way depicted in FIG. 16B, during the line synchronization signal hsync for the normal 600 dpi printing way having a low level, two lines of image data is written on the photosensitive body 25. In this case, a frequency of a clock signal used for transferring image data to the LPHs is equal to or higher than the double of a frequency of clock signal used for the normal 600 dpi printing way. As a result, it is possible to transfer two lines of image data during a period for writing one line of image data. Further, during 1.5-time density transformation, the 1.5-time density transformation unit 501-4-2 in FIG. 8 generates image data such that 2 bits are allocated to each pixel. As a result, one line of thus-generated image data substantially includes two lines of image data. In this case, as depicted in FIG. 16B, during a period in which a line synchronization signal hsync for 1200 dpi has a low level first time, the higher-order bit of the 2 bits is transferred to the LPHs for each pixel. Then, LEDs of even-th pixels of the LPHs are driven, and thus, the even-th pixels "even data" are written on the photosensitive body 25. In the same way, LEDs of odd-th pixels of the LPHs are driven, and thus, the odd-th pixels "odd data" are written on the photosensitive body 25. During a period in which the line synchronization signal hsync for 1200 dpi has a low level second time, the lower-order bit of the 2 bits is transferred to the LPHs for each pixel. Then, LEDs of even-th pixels of the LPHs are driven, and thus, the even-th pixels "even data" are written on the photosensitive body 25. In the same way, LEDs of odd-th pixels of the LPHs are driven, and thus, the odd-th pixels "odd data" are written on the photosensitive body 25. It is noted that, a more specific procedure is the same as that in the normal way described with reference to FIG. 16A except that two lines of image data is written in a writing period for one line of image data as mentioned above, and duplicate description will be omitted. It is noted that the photosensitive body 25 rotates in the sub-scan direction after the image data of the higher-order bits is written on the photosensitive body 25 until the image data of the lower-order bits are written on the photosensitive body 25. Therefore, corresponding two lines are written on the photosensitive body 25 with a difference in their written positions along the sub-scan direction therebetween accordingly.

Thus, by means of the pseudo 1200 dpi printing way, it is possible to write two lines of image data during a period for a normal 600 dpi printing way, and thus, it is possible to improve resolution in the sub-scan direction in 1.5-time density transformation.

FIG. 17 illustrates an example of how to determine pixels such as those indicated by rectangles filled with halftone dots depicted in FIGS. 12A-12F. In FIG. 17, reference patterns P2, P11, P9, P6 and P13 corresponds to the reference patterns P2, P11, P9, P6 and P13 depicted in FIGS. 12A-12F. As mentioned above with reference to FIGS. 12A-12F, the transformation patterns P22, P31, P29, P26 and P33 correspond to the reference patterns P2, P11, P9, P6 and P13, respectively. As mentioned above, pixels indicated as rectangles filled with halftone dots in FIGS. 12A-12F are determined with the register data depicted in FIG. 13. FIG. 17 depicts specific examples of pixel values, i.e., whether pixels as those filled with halftone dots depicted in FIGS. 12A-12F are determined as actually white pixels or black pixels. In FIG. 17, white rectangles or squires denote white pixels, and hatched rectangles or squires denote black pixels.

With reference to FIG. 17, how to determine the register data depicted above with reference to FIGS. 13 and 14, i.e., how to determine transformation patterns for the above-mentioned 12 zones Z1-Z12 and how to determine, as to the joint parts Z13 and Z14, transformation patterns for the matrices E1-E10 depicted in FIG. 11, will now be described.

First, certain initial values are set as the register data of FIGS. 13 and 14, and then, with the use thereof, the image forming apparatus is operated to print a predetermined test chart. Then, an operator checks a thus-printed test chart. As a result of the checking, for example, when a line included in the test chart is too bold, corresponding one of the register data of FIGS. 13 and 14 is determined such that a transformation pattern is to be provided and therewith, a line included in the test chart is printed as being finer. In the same way, when a line included in the test chart is too fine, corresponding one of the register data of FIGS. 13 and 14 is determined such that a transformation pattern is to be provided and therewith, a line included in the test chart is printed as being bolder.

For example, in FIG. 17, for the reference pattern P2, three different transformation patterns P22-1 through P22-3 are depicted. Thereamong, a transformation pattern P22-2 is one for a line included in the test chart to be printed finer, in comparison to a case of a transformation pattern P22-1. In the same way, a transformation pattern P22-3 is one for a line included in the test chart to be printed further finer. In the same way, a transformation pattern P22-2 is one for a line included in the test chart to be printed bolder, in comparison to a case of a transformation pattern P22-3. In the same way, a transformation pattern P22-1 is one for a line included in the test chart to be printed further bolder. The same way can be applied also for the other examples, i.e., transformation patterns 31-1 through 31-3 for the reference pattern P11, transformation patterns 29-1 through 29-3 for the reference pattern P9, transformation patterns 26-1 through 26-3 for the reference pattern P6, and transformation patterns 33-1 through 33-3 for the reference pattern P13, depicted in FIG. 17

Figure 18:
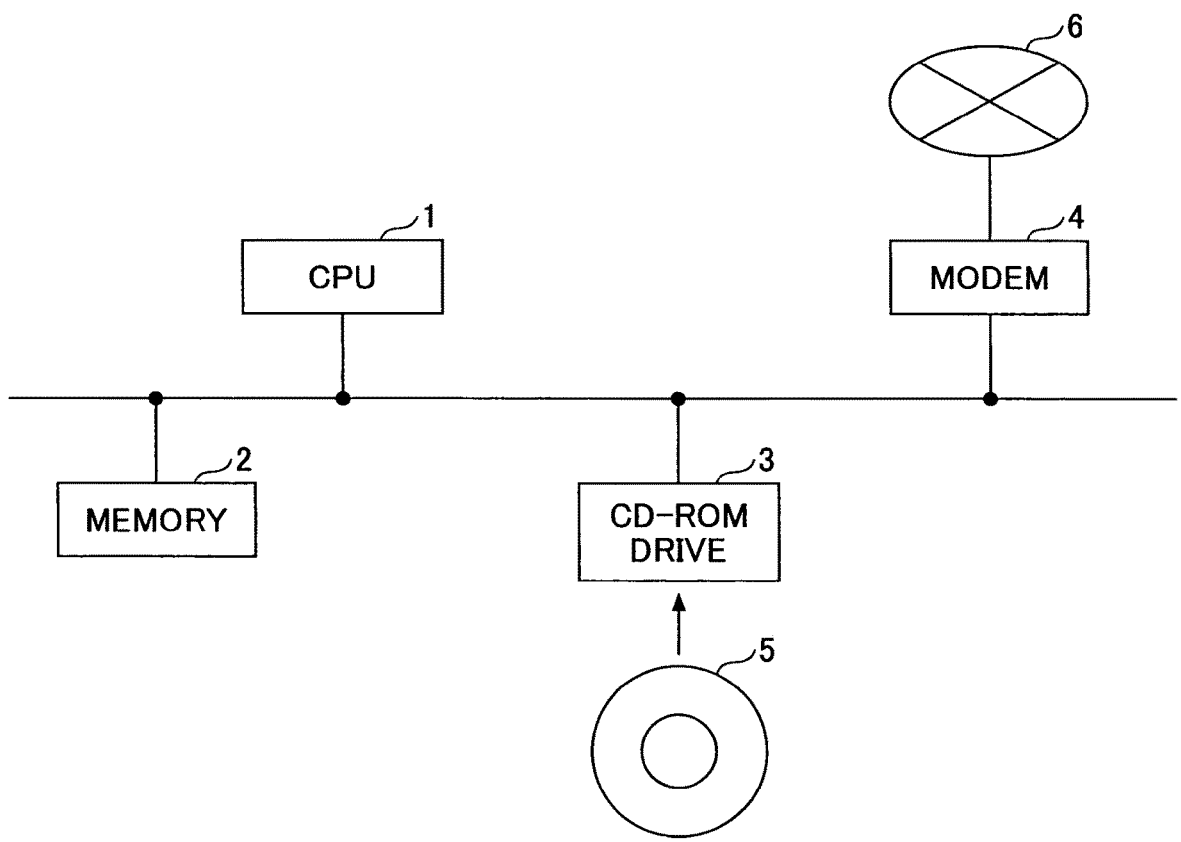
FIG. 18 depicts a block diagram of one example of a configuration of a system control unit in a form of a computer for illustrating a case where the system control unit has a form of the computer and image writing processing is performed by a CPU of the system control unit in the form of the computer.

In image writing processing carried out in the above-described embodiment may be realized as a result of a corresponding image writing program being created, which image writing program is to be executed by a CPU which may be included in the system control unit 302 depicted in FIG. 1, or, which image writing program may be provided as digital data by means of a flexible disk, a CD-ROM, a DVD, or such as digital data, or which image writing program may be provided via a communication network as digital data. FIG. 18 depicts a hardware configuration example of the system control unit 302 for a case where, as mentioned above, operations carried out by the writing unit 500 depicted in FIG. 1 except operations carried out by the LPHs 503-1 through 503-3 themselves is actually carried out by a CPU of the system control unit 302.

In the case, as depicted in FIG. 18, the system control unit 302 includes a CPU 1, a memory 2, a CD-ROM drive 3, and a modem 4. To the CD-ROM drive 3, a CD-ROM 5 is loaded. Then, by means of the CD-ROM 5, various programs and various data may be loaded to the memory 2 of the system control unit 302. The modem 4 is connected to a communication network 6 such as the Internet, a LAN or such. By means of the communication network 6, various programs and various data may be downloaded to the memory 2 of the system control unit 302 from an external server. By means of the CD-ROM 5 or by means of the communication network 6, the above-mentioned image writing program is loaded or downloaded to the memory of the system control unit 302. The CPU 1 executes the image writing program from the memory 2, and thus, the CPU 1 carries out operations carried out by the writing unit 500 depicted in FIG. 1 except operations carried out by the LPHs 503-1 through 503-3 themselves.

Thus, in the embodiment, it is possible to avoid or reduce possible image quality degradation which may otherwise occur during 1.5-time density transformation. Further, it is possible to avoid or reduce possible image quality degradation which may otherwise occur because of light emitting amount variations which may occur in the LPHs 503-1 through 503-3. Further, it is possible to avoid or reduce possible image quality degradation which may otherwise occur in the joint parts Z13 and Z14 between the LPHs 503-1 through 503-3. Further, it is possible to avoid or reduce possible image quality difference which may otherwise occur according to an image height position or a position along the main scan direction.

The present invention is not limited to the specifically disclosed embodiments, and variations and modifications may be made without departing from the scope of the present invention.

The present application is based on Japanese priority applications Nos. 2008-154283 and 2009-137715, filed Jun. 12, 2008 and Jun. 8, 2009, respectively, the entire contents of which are hereby incorporated herein by reference.

What is claimed is:

1. An image writing unit, comprising:
a plurality of light emitting device array units each having a light emitting device array in which a plurality of light emitting devices are arranged in one direction, wherein a length of each light emitting device array unit is shorter than a length of the photosensitive body in a main scan direction; and
a control part configured to use a transformation pattern to transform, in a density transformation mode, image data for each matrix of n by n pixels, wherein, a rate of writing an image in a sub-scan direction is multiplied by m, and a pixel density of image data written on the photosensitive body is multiplied by (2B+1)/2 in the main scan direction, and multiplied by m(2B+1)/2 in the sub-scan direction, where n denotes a positive integer, m denotes a positive integer and B denotes a positive integer, wherein:
in the density transformation mode, a transformation pattern which is selected according to a position along the main scan direction at which an image is written with respect to a position of each of the plurality of light emitting device array units, is used to transform image data.

2. The image writing unit as claimed in claim 1, wherein:
in the density transformation mode, the control part determines which one of the plurality of the light emitting device array units is used to write an image based on image data currently processed, and carries out image data transformation according to a determination result.

3. The image writing unit as claimed in claim 1, wherein:
in the density transformation mode, the control part determines whether currently processed image data belongs to a joint part included in a range in which respective pixel effective areas of adjacent ones of the plurality of light emitting device array units overlap one another, and carries out image data transformation according to a determination result.

4. The image writing unit as claimed in claim 1, wherein:
in the density transformation mode, the control part detect a position along the main scan direction at which an image is written on the photosensitive body based on image data currently processed, and carries out image data transformation according to the detected position.

5. An image forming apparatus comprising:
the image writing unit claimed in claim 1 which emits light to the photosensitive body and forms an electrostatic latent image on the photosensitive body;
a developing unit configured to develop the electrostatic latent image; and
a transfer unit configured to transfer a developed image to a sheet-shaped recording medium.

6. An image writing method for an image forming apparatus, comprising:
writing an image on a photosensitive body with the use of a plurality of light emitting device array units each having a light emitting device array in which a plurality of light emitting devices are arranged in one direction, wherein a length of each light emitting device array unit is shorter than a length of the photosensitive body in a main scan direction; and
in a density transformation mode, transforming image data for each matrix of n by n pixels, wherein a rate of writing an image in a sub-scan direction is multiplied by m, and a pixel density of image data written on the photosensitive body is multiplied by $(2B+1)/2$ in the main scan direction, and multiplied by $m(2B+1)/2$ in the sub-scan direction, where n denotes a positive integer, m denotes a positive integer and B denotes a positive integer, wherein:
in the density transformation mode, a transformation pattern which is selected according to a position along the main scan direction at which an image is written with respect to a position of each of the plurality of light emitting device array units, is used to transform image data.

7. A computer-readable recording medium encoded with a computer executable program which, when executed by a computer processor, performs steps of an image writing method, the method comprising:
writing an image on a photosensitive body with the use of a plurality of light emitting device array units each having a light emitting device array in which a plurality of light emitting devices are arranged in one direction, wherein a length of each light emitting device array unit is shorter than a length of the photosensitive body in a main scan direction; and
in a density transformation mode, transforming image data for each matrix of n by n pixels, wherein a rate of writing an image in a sub-scan direction is multiplied by m, and a pixel density of image data written on the photosensitive body is multiplied by $(2B+1)/2$ in the main scan direction, and multiplied by $m(2B+1)/2$ in the sub-scan direction, where n denotes a positive integer, m denotes a positive integer and B denotes a positive integer, wherein:
in the density transformation mode, a transformation pattern which is selected according to a position along the main scan direction at which an image is written with respect to a position of each of the plurality of light emitting device array units is used to transform image data.

\* \* \* \* \*